US010133910B2

(12) United States Patent
Chang et al.

(10) Patent No.: US 10,133,910 B2
(45) Date of Patent: Nov. 20, 2018

(54) ELECTRONIC DEVICE WITH KEY MODULE AND METHOD OF MANUFACTURING THE SAME

(71) Applicant: SAMSUNG ELECTRONICS CO., LTD., Suwon-si, Gyeonggi-do (KR)

(72) Inventors: Joon-Won Chang, Gumi-si (KR); Ki-Hwan Kwak, Gumi-si (KR); Jeong-Eon Kim, Daegu (JP); Tae-Won Kim, Daegu (JP); Ye-Seul Lee, Gumi-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 119 days.

(21) Appl. No.: 15/410,990

(22) Filed: Jan. 20, 2017

(65) Prior Publication Data

US 2017/0213068 A1    Jul. 27, 2017

(30) Foreign Application Priority Data

Jan. 21, 2016  (KR) .................. 10-2016-0007558

(51) Int. Cl.
*G06K 9/00* (2006.01)
*H01H 13/14* (2006.01)
(Continued)

(52) U.S. Cl.
CPC .......... *G06K 9/00087* (2013.01); *H01H 13/14* (2013.01); *H04M 1/23* (2013.01); *H04M 1/0266* (2013.01); *H04M 1/0277* (2013.01)

(58) Field of Classification Search
CPC . G06K 9/00087; H01H 13/14; H04M 1/0266; H04M 1/0277; H04M 1/23
See application file for complete search history.

(56) References Cited

U.S. PATENT DOCUMENTS 9,001,081 B2 * 4/2015 Pope ....................... G06F 3/044
                                                                    345/174
9,622,556 B2 * 4/2017 Fathollahi .............. A45C 11/00

FOREIGN PATENT DOCUMENTS

KR    10-2008-0104930    12/2008

* cited by examiner

*Primary Examiner* — Phuoc Tran
(74) *Attorney, Agent, or Firm* — Nixon & Vanderhye, P.C.

(57) ABSTRACT

An electronic device according to the present disclosure includes: a housing including a first plate directed in a first direction, a second plate facing a second direction opposite the first direction, and a side member that encloses at least a portion of a space between the first plate and the second plate; a display disposed to be exposed through a first region of the first plate; a first opening formed in a second region of the first plate that is located adjacent to the display; a button structure disposed through the first opening, in which the button structure includes a cover layer exposed to an outside of the housing, an annular structure that encloses at least a portion of the cover layer when viewed from above the cover layer, and a fingerprint recognizing member enclosed by the annular structure and including a fingerprint recognizing pad including a plurality of conductive lines formed to recognize a fingerprint when a user's finger comes in contact with the cover layer, and a circuit region including conductive paths connected to at least some of the plurality of conductive lines; and a lower plate connected to the annular structure. The cover layer, the annular structure, and the lower plate are configured to substantially enclose the fingerprint recognizing member, and the lower plate includes a second opening that communicates with at least a portion of the circuit region.

20 Claims, 12 Drawing Sheets

(51) Int. Cl.
*H04M 1/23* (2006.01)
*H04M 1/02* (2006.01)

ELECTRONIC DEVICE WITH KEY MODULE AND METHOD OF MANUFACTURING THE SAME

CROSS-REFERENCE TO RELATED APPLICATION

This application is based on and claims priority under 35 U.S.C. § 119 to Korean Application Serial No. 10-2016-0007558, which was filed in the Korean Intellectual Property Office on Jan. 21, 2016, the content of which is incorporated by reference herein in its entirety.

TECHNICAL FIELD

The present disclosure relates generally to a portable electronic device, a key module equipped in the portable electronic device, and a manufacturing method related to the electronic device.

BACKGROUND

Recently, portable terminals with novel functions have been developed rapidly, and as the distribution of the portable terminals has expanded, the portable terminals are representing a gradually increasing share of people's lives.

Alternatively, portable terminals (e.g., a smart phone) that have been popularized with the development of the mobile communication technology adapt various keys that are provided on the front face, the rear face, and the side face thereof.

Further, as users' needs for portable terminals have been gradually diversified, a key used in the portable terminals includes a waterproof structure in order to prevent a fluid from infiltrating into the interior of the portable terminals.

A home key waterproof structure using a fingerprint recognition sensor that is used in a portable terminal is manufactured in a structure to be fixed to a key bracket by insert-molding a flexible printed circuit board in a home key mold. However, the home key waterproof structure is formed in a structure through which the flexible printed circuit board passes to the outside of the key bracket so that indentations are generated in a sealing member region for waterproof. The indentations have irregular shapes and considerably deteriorate the sealing effect, which causes a high percentage of defects and makes the waterproof function instable. Alternatively, due to a structure in which a plurality of components are stacked in multiple tiers on the top and bottom faces of the flexible printed circuit board, a key click feeling is considerably degraded.

SUMMARY

The present disclosure provides an electronic device including an input device in which an instable waterproof point is removed and a key click feeling is improved with a simple structure.

According to an example embodiment of the present disclosure, an electronic device may include: a housing that includes a first plate directed in a first direction, a second plate that faces a second direction opposite to the first plate, and a side member that encloses at least a portion of a space between the first plate and the second plate; a display disposed to be exposed through a first region of the first plate; a first opening formed in a second region of the first plate located adjacent to the display; a button structure disposed through the first opening, wherein the button structure includes a cover layer exposed to an outside of the housing, an annular structure that encloses at least a portion of the cover layer when viewed from above the cover layer, and a fingerprint recognizing member comprising a fingerprint recognizing pad including a plurality of conductive lines configured to recognize a fingerprint when a finger comes in contact with the cover layer, the fingerprint recognizing member being enclosed by the annular structure, and a circuit region comprising conductive paths connected to at least some of the plurality of conductive lines; and a lower plate connected to the annular structure. The cover layer, the annular structure, and the lower plate may be configured to substantially enclose the fingerprint recognizing member, and the lower plate may include a second opening that communicates with at least a portion of the circuit region. The electronic device may further include: a flexible conductive member extending from the circuit region into the space through the second opening, and electrically connected to the circuit region; a first seal disposed between the fingerprint recognizing member and the lower plate and/or the fingerprint recognizing member and the annular structure; and a second seal coupled to the lower plate and/or the annular structure.

According to various example embodiments of the present disclosure, a key module may include: a fingerprint recognizing member comprising a fingerprint recognizing pad including a plurality of conductive lines formed to recognize a fingerprint, and conductive paths connected to at least some of the plurality of conductive lines; an annular structure configured to enclose the fingerprint recognizing member to prevent the fingerprint recognizing member from being separated outwardly; a lower plate connected to the annular structure and including an opening that is in contact with at least a portion of a circuit region; and a flexible conductive member extending from the circuit region into the space through the opening, and electrically connected to the circuit region.

According to various example embodiments of the present disclosure, a method of manufacturing an electronic device may include: forming a fingerprint recognizing member comprising a fingerprint recognizing pad including a plurality of conductive lines formed to recognize a fingerprint and a circuit region including conductive paths that are connected to the plurality of conductive lines; bonding an annular first seal to a bottom face of the fingerprint recognizing member; contacting and connecting a flexible conductive member, which passes through an inner hole of the first seal, with the circuit region; and forming an annular structure to partially enclose an outer peripheral surface of the fingerprint recognizing member.

According to an example embodiment of the present disclosure, because the printed circuit boards in the key module are implemented by different materials, then the respective boards are bonded to each other, and at the same time, a component is formed with an opening through which the printed circuit boards pass, thereby maximizing and/or improving the waterproof performance.

According to an example embodiment of the present disclosure, due to the integral key module structure, the waterproof function can be implemented with a simple structure.

According to various example embodiments of the present disclosure, because the waterproof performance of the electronic device, which is obtained with the key module structure, is stabilized, it is possible to improve a yield.

According to various example embodiments of the present disclosure, as a common use is enabled according to modularization, it is possible to reduce material costs.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
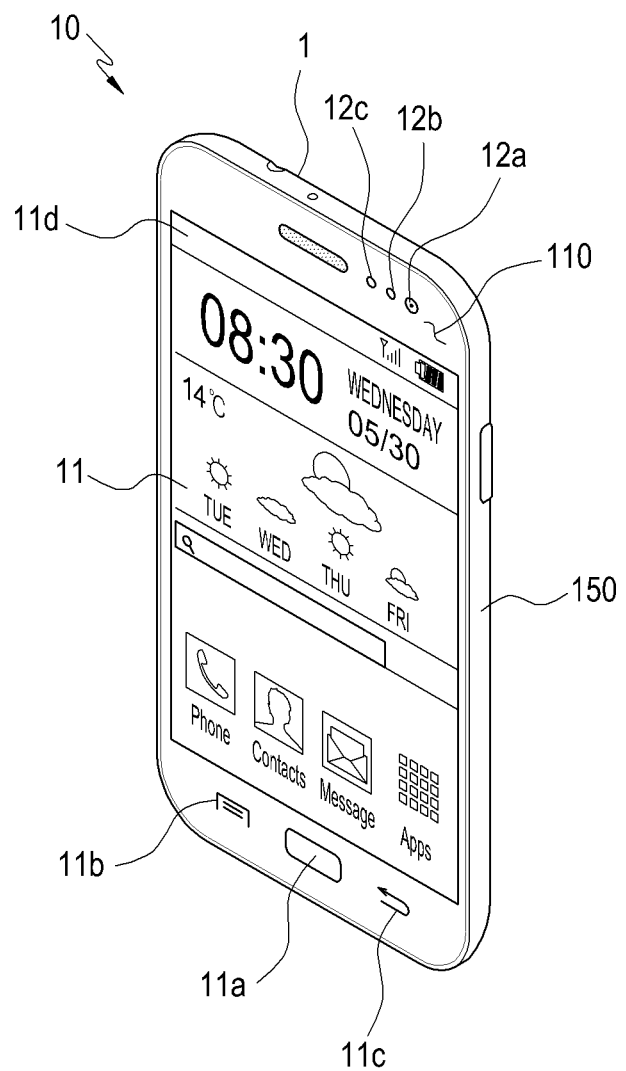
FIG. 1 is a perspective view illustrating the front face of an example electronic device that is provided with a key module according to an example embodiment of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. In some situations, the expression "device configured to" may refer, for example, to a situation in which the device, together with other devices or components, "is able to". For example, the phrase "processor adapted (or configured) to perform A, B, and C" may refer, for example, to processing circuitry, a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even when a term is defined in the present disclosure it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Figure 2:
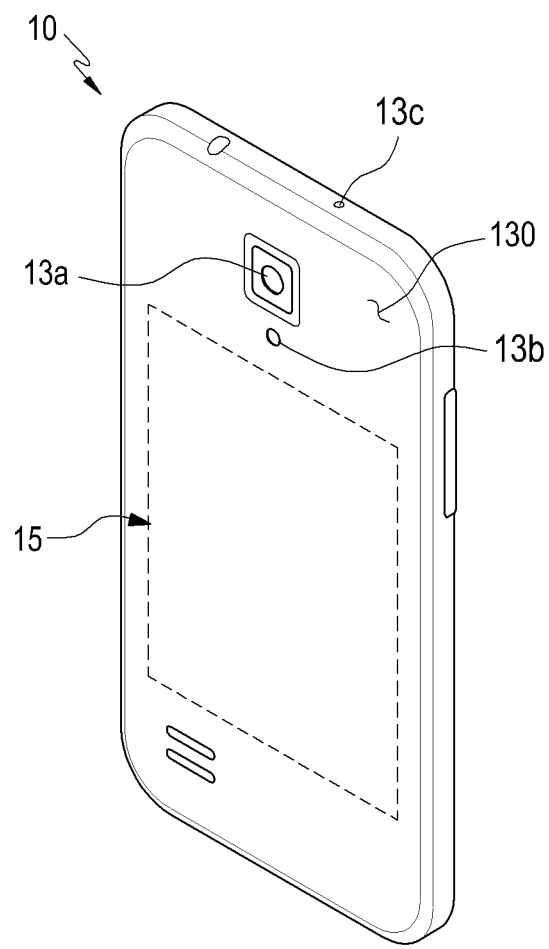
FIG. 2 is a perspective view illustrating the rear face of an example electronic device that is provided with a key module according to an example embodiment of the present disclosure.

FIG. 1 is a perspective view illustrating the front face of an example electronic device according to various example embodiments of the present disclosure. FIG. 2 is a perspective view illustrating the rear face of an example electronic device according to various example embodiments of the present disclosure. The electronic device 10 may, for example, be a smart phone or a wearable device, but is not limited thereto. Components of an electronic device, such as a smart phone, will be described with reference to FIGS. 1 and 2.

According to various example embodiments of the present disclosure, as illustrated in FIG. 1, an electronic device 10 may include a touch screen 11 that is disposed on substantially the center of the front face thereof. The touch screen 11 may occupy a large portion of the front face of the electronic device 10. FIG. 1 illustrates an example in which a main home screen is displayed on the touch screen 11. The main home screen may be the first screen that is displayed on the touch screen 11 when the power of the electronic device 10 is turned on. When the electronic device 10 has several pages of different home screens, the main home screen may be the first home screen among the several pages of home screens. The home screen may display shortcut icons to execute frequently used applications, a main menu switching key, time, weather, or the like. The main menu switching key may cause a menu screen to be displayed on the touch screen 11. In addition, in the upper end of the touch screen 11, status bars 11*d* may be formed to indicate the statuses of the device, such as a battery charge status, a received signal strength, and the current time. Below the touch screen 11, a home key 11*a*, a menu button 11*b*, and a back button 11*c* may be formed.

According to an example embodiment, the home key 11*a* may cause the main home screen to be displayed on the touch screen 11. For example, when the home key 11*a* is touched in the state where any home screen, which is different from the main home screen, or the menu screen is displayed on the touch screen 11, the main home screen may be displayed on the touch screen 11. Alternatively, when the home key 11*a* is touched while applications are being executed on the touch screen 11, the main home screen may be displayed on the touch screen 11. The home key 11*a* may also be used for causing the most recently used application or a task manager to be displayed on the touch screen 11. The menu button 11*b* may provide a connection menu that is capable of being used on the touch screen 11. The connection menu may include, for example, a widget addition menu, a background screen change menu, a retrieve menu, an edition menu, or an environment setting menu. The back button 11*c* may cause the screen, which has been executed just prior to the currently executed screen, to be displayed, or may cause the most recently used application to be terminated.

According to various example embodiments, as illustrated in FIG. 1 described above, a first camera 12*a*, an illuminance sensor 12*b*, or a proximity sensor 12*c* may be arranged in the upper end region of the front face of the electronic device 10.

According to various example embodiments of the present disclosure, as illustrated in FIG. 2, a second camera 13*a*, a flash 13*b*, or a speaker 13*c* may be included in the rear face of the electronic device 10. When the electronic device 10 is configured such that a battery pack is detachably mounted thereon, the rear face of the electronic device 10 may be a detachable battery cover 15.

Figure 3:
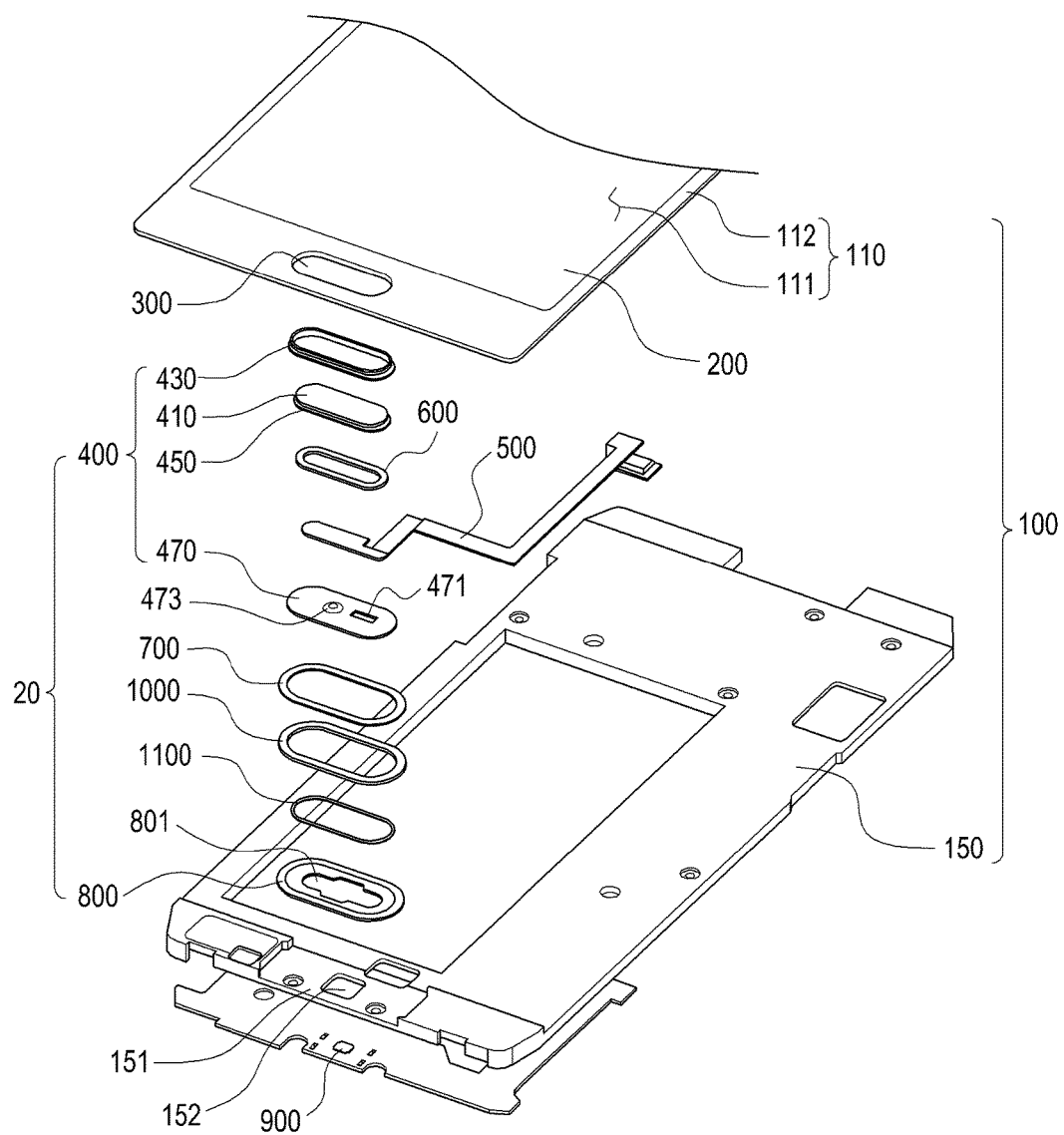
FIG. 3 is an exploded perspective view illustrating the components of an example key module provided in an electronic device according to an example embodiment of the present disclosure.

According to an example embodiment, the key module 20 (as illustrated in FIG. 3) applied to the electronic device 10 is a data input device, and may be formed of a touch pad, a touch screen, or the like, in addition to a key input device to which data may be input mainly by a finger pushing operation. The key input device used for data input may include an arrangement of a plurality of key arrays. Such keys may include a send key, which is a communication start button, a cancel key, a correction key, a number key, a character key, an end key, a power key, etc. Alternatively, the key input device may be provided with a keypad on the front face of the terminal, and may be provided with a plurality of side keys to support the function of the keypad and each to play a roll of a function key.

In the present embodiment, the key module is described with reference to the above-described home key by way of an example, but is not limited thereto, and when the key module is a key module that is driven for data input, it may be variously applied to various keys such as a side key, in addition to the above-mentioned home key 11a. In the present embodiment, descriptions will be made with reference to a key module that is provided with a waterproof function.

In the following, descriptions will be made with reference to a configuration of the key module 20 provided in the electronic device 10 according to various embodiments of the present disclosure.

FIG. 3 is a perspective view illustrating the components of a key module 20 provided in an example electronic device according to various example embodiments of the present disclosure.

As illustrated in FIGS. 1 to 3, the electronic device 10 of the present disclosure may include a housing 100, a display 200, a first opening 300, and a key module 20. The key module 20 may include a button structure 400, a flexible conductive member 500, sealing members 600, 700, and 1100, an elastic member 800, and a bracket 1000.

According to an example embodiment, the housing 100 may include a first plate 110 disposed to face in a first direction, a second plate 130 disposed to face in a second direction that is opposite to the first direction, and a side member 150 disposed between the first plate 110 and the second plate 130.

For example, the first plate 110 may form the front cover of the electronic device 10, and the second plate 130 may form the rear cover of the electronic device 10. In addition, the side member 150 may be configured to enclose at least a portion formed between the first plate 110 and the second plate 130.

The first plate 110 and the second plate 130 may be formed in a flexible shape in which a curved portion is partially included, as well as being formed in a flat plate shape. The outer face of the side member 150 may also be formed in a shape in which a curved portion is partially included such that a user may easily wrap and hold the side member 150 by a hand. Accordingly, when the button structure 400 is disposed on the front face of the electronic device 10, the user may easily click the button structure 400 in the state of gripping the electronic device 10.

According to an example embodiment, the side member 150 is disposed between the first plate 110 and the second plate 130, and may form a space in which inner electronic components are mountable while forming the outer face of the housing 100. The side member 150 may include a seating portion on which at least a portion of the key module 20 that includes the button structure 400, the flexible conductive member 500, the first sealing member 600, and the second sealing member 700. The seating portion 151 may have a shape that corresponds to the lower end portion of the key module such that the lower end portion of the key module 20 can be fixed while being seated thereon. The seating portion 151 may be formed with a hole 152 through which a dome switch 900 may protrude.

According to an example embodiment, the display 200 may include the above-mentioned touch screen 11 (see FIG. 1) or the like in concept. In an example embodiment of the present disclosure, the display 200 may be disposed in the space formed between the first plate 110 and the second plate 130 and may be configured to include a screen region exposed through the first region 111 of the first plate 110.

Because the components of the display 200 and various devices disposed within the housing 100 have been described above, more detailed descriptions thereof will be omitted.

According to an example embodiment, the first opening 300 may be formed in a second region 112 of the first plate 110, which is adjacent to the display 200. The first opening 300 may be fabricated in a hole shape such that the button structure 400 is exposed to the outside to be capable of being touched by the user. While the first opening 300 is formed in an oval hole in the example embodiment of the present disclosure, but may be implemented in various shapes, such as a circular shape or a rectangular shape, without being limited thereto.

According to an example embodiment, the key module 20 may include a button structure 400 that is partially exposed to the first opening 300, a flexible conductive member 500 at least partially disposed in the button structure 400 to transmit an electric signal, and sealing members 600, 700, and 1100 provided for the waterproof function of the key module, and may include an elastic member 800 and a bracket 1000 that protect the button structure 400. Hereinafter, a connective relationship between the key module 20 and the housing 100 and the constitution of the key module 20 will be described based on additional drawings.

Figure 4A:
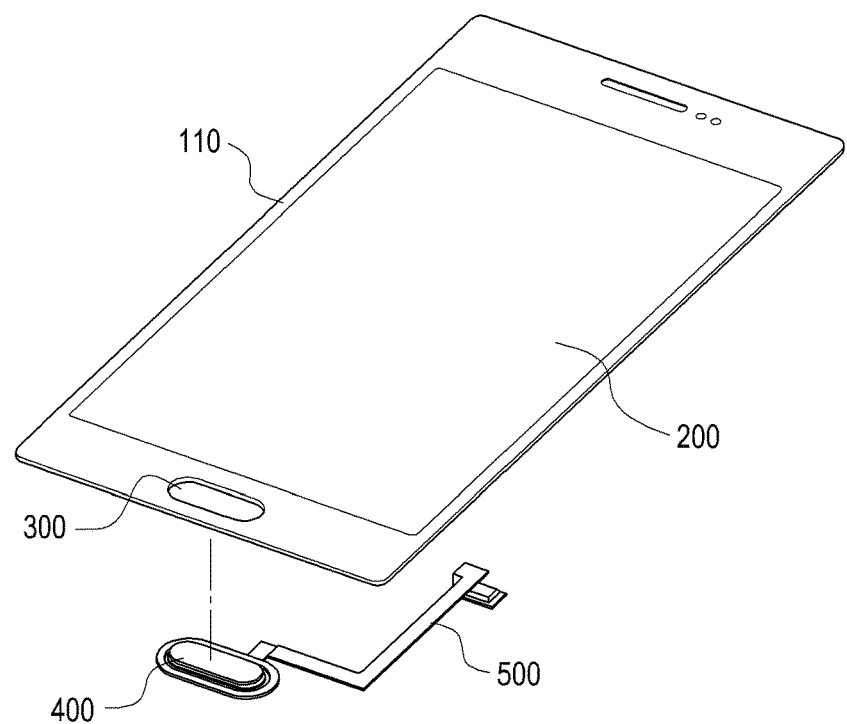
FIG. 4A is an exploded perspective view illustrating a first plate and a key module that are provided in an example electronic device according to an example embodiment of the present disclosure.
Figure 4B:
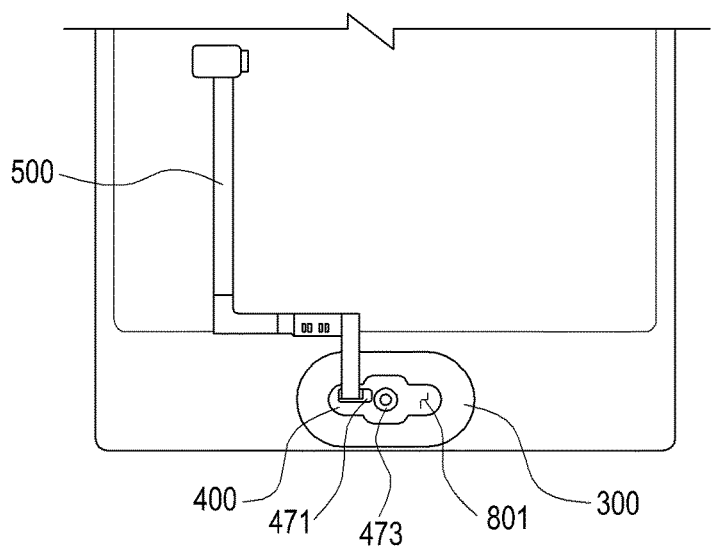
FIG. 4B is a diagram illustrating the first plate and the key module according to an example embodiment of the present disclosure when viewed from the rear side of the first plate after the first plate and the key module are coupled to each other.

FIG. 4A is an exploded perspective view illustrating the first plate 110 and the key module 20 that are provided in an example electronic device according to an example embodiment of the present disclosure. FIG. 4B is a simplified view illustrating the first plate 110 and the key module 20 according to an example embodiment of the present disclosure when viewed from the rear side of the first plate 110 after the first plate 110 and the key module 20 are formed.

Figure 5A:
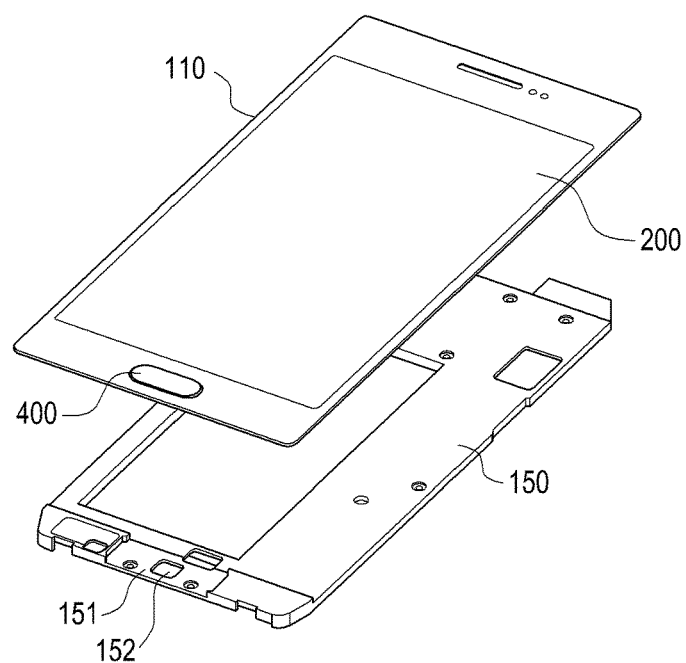
FIG. 5A is an exploded view illustrating a state before a first plate, which is coupled with a key module according to an example embodiment of the present disclosure, is coupled with a side member.
Figure 5B:
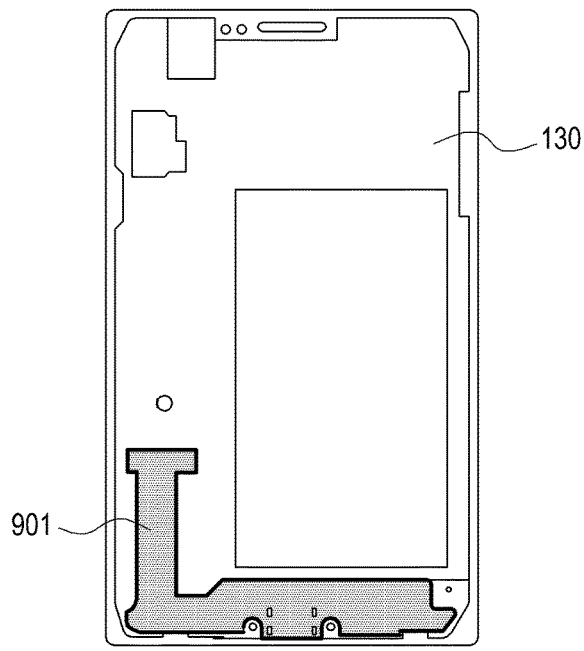
FIG. 5B is a top plan view of a second plate.
Figure 6A:
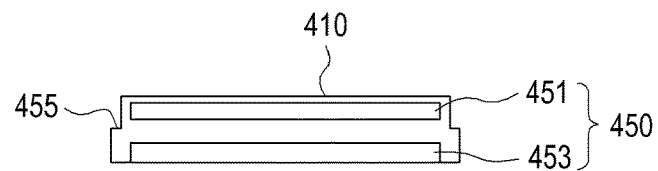
FIGS. 6A, 6B, 7A, 7B and 8 are sectional views each illustrating each of the components of a key module of an electronic device according to an example embodiment of the present disclosure is mounted.
Figure 6B:
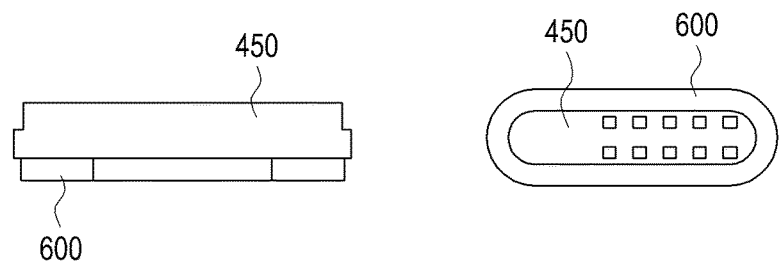
Figure 7A:
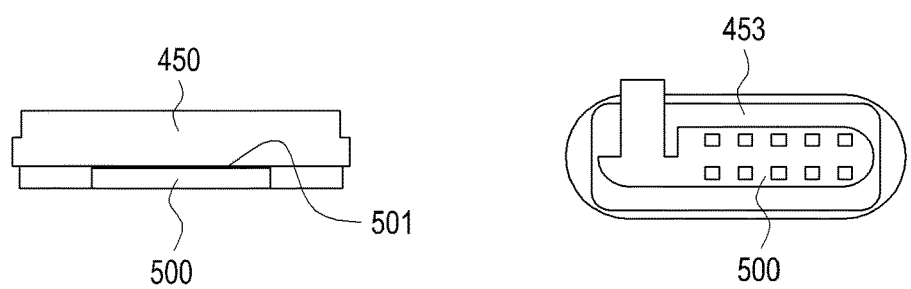
Figure 7B:
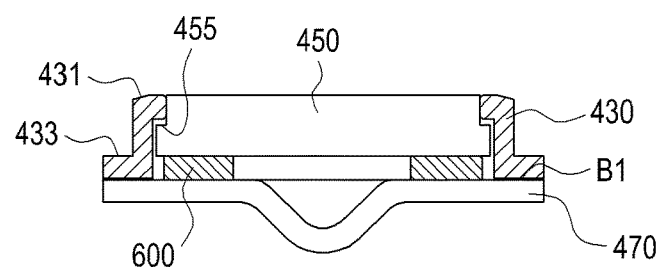

FIG. 5A is an exploded view illustrating a state before the first plate 110, which is coupled to the key module 20 according to an example embodiment of the present disclosure, and the side member 150 are coupled to each other. FIG. 5B is a top plan view of the second plate 130.

Referring to FIGS. 3 to 5, the key module 20 according to an example embodiment of the present disclosure may be disposed to partially protrude to the front face of the portable electronic device 10, and may include a button structure 400, a flexible conductive member 500, sealing members (e.g., seals) 600, 700, and 1100, an elastic member 800, and a bracket 1000.

According to an example embodiment, the key module 20 may be disposed in the inside of the front face of the electronic device 10 such that the user may input data information in a click or touch manner and may transmit an electric signal to the inside of the electronic device 10 in order to acquire desired information.

In FIG. 4A, the completely assembled key module 20 may be coupled to the first opening 300 of the first plate 110. For example, a cover layer 410, a fingerprint recognizing member 450, and an annular structure 430, which correspond to the upper portion of the key module 20, may be disposed to partially protrude to the outside through the first opening 300. The protruding upper portion of the key module 20 is a portion to be in direct contact with a user's fingerprint, and may be configured to move up and down to correspond to the upward and downward movements of the dome switch 900 disposed therebelow according to the user's click. Alternatively, a signal transmitted according to the click may transmit an electric signal to the inside of the electronic device 10 via the flexible conductive member 500 disposed below the key module 20. The signal transmission is interlocked in real time with a display screen displayed on the display 200 so that the user may confirm information and may input required information.

In FIG. 4B, when viewing the rear face of the first plate 110, to which the key module 20 is coupled, the flexible conductive member 500 may extend to the space of the electronic device 10 via the opening disposed at the center of the key module 20. For example, after passing through various openings, the flexible conductive member 500 may finally extend to the inside of the electronic device 10 via a second opening 471 of a lower plate 470 and a third opening 801 of an elastic member 800.

According to an example embodiment, at the center of the button structure 400, a concave recess 473 may be formed in the inside of the lower plate 470 which may be disposed to face the dome switch 900. The concave recess 473 may be formed of an elastic material, and may be designed in a convexly protruding shape when viewed from the rear side.

Hereinafter, the contents of the structures of the second opening 471 and the concave recess 473 of the lower plate 470 will be described.

FIGS. 5A and 5B illustrate an arrangement relationship between the first plate 110 coupled to the key module 20 and the side member 150. The lower portion of the key module 20, which does not protrude to the outside of the housing 100, may be fixedly seated on the seating portion 151 of the side member 150. The dome switch 900 may be disposed inside the seating portion 151 through the hole 152 of the seating portion 151 (see FIG. 3). The dome switch 900 may be elastically and mechanically deformed by the user's click to transmit the signal to the inside of the electronic device 10. The above-mentioned concave recess 473 may be disposed to face the dome switch 900.

Inside the second plate 130, various components, such as a printed circuit part 901 and a battery, may be mounted. The printed circuit part 901 may be disposed to be connected with the dome switch 900 so as to receive a signal and to transmit the signal to each device.

FIGS. 6A, 6B, 7A, 7B and 8 are sectional views each illustrating each of the components of a key module 20 of an example electronic device according to an example embodiment of the present disclosure is mounted.

According to an example embodiment, the key module 20 may include a fingerprint recognizing member 450, a cover layer 410, an annular structure 430, a lower plate 470, one or more sealing members 600, 700, and 1100, an elastic member 800, and a bracket 1000.

In an example embodiment of the present disclosure, the cover layer 410, the annular structure 430, the fingerprint recognizing member 450, and the lower plate 470 of the key module 20 may be described as a button structure 400.

According to an example embodiment of the present disclosure, referring to FIG. 6, the fingerprint recognizing member 450 of the button structure 400 may include a fingerprint recognizing pad 451 and a circuit region 453. The fingerprint recognizing pad 451 may include a plurality of conductive lines that are capable of recognizing the user's fingerprint. For example, the fingerprint recognizing pad 451 may be a fingerprint recognizing sensor, and the fingerprint recognizing pad 451 may operate by recognizing a fingerprint that has been set, or is to be set, when the user's fingerprint comes in contact with the cover layer 410 that covers the top face of the fingerprint recognizing pad 451.

According to an example embodiment, the circuit region 453 may be disposed below the fingerprint recognizing pad 451. Conductive routes connected at least some of the plurality of conductive lines of the fingerprint recognizing pad 451 may be included. For example, the circuit region 453 may be a printed circuit board (PCB), and may include a plurality of contact points formed on the lower portion thereof to be electrically contacted with another printed circuit board.

According to an example embodiment, the cover layer 410 may be formed above the fingerprint recognizing member 450. The cover layer 410 may be a portion that is exposed to the outside of the housing 100, and is to come in direct contact with the user's fingerprint. The cover layer 410 is capable of protecting the fingerprint recognizing pad 451 such that the fingerprint recognizing pad 451 is not damaged by an external pressure or scratch, and the fingerprint recognizing pad 451 is not electrically damaged by moisture or foreign matter.

According to an example embodiment, the cover layer 410 and the fingerprint recognizing member 450 may have an oval shape in a top plan view, and the lower end portion of the fingerprint recognizing member 450 may be formed with an annular stepped portion 455 so as to prevent the fingerprint recognizing member 450 from being separated from the first opening 300. However, without being limited to the above-mentioned shapes, the above-mentioned components may be variously modified and designed according to the structural shape or design of the electronic device 10 and the user's convenience.

According to various embodiments of the present disclosure, referring to FIG. 7, the annular structure 430 may be arranged along the outer peripheral surfaces of the cover layer 410 and the fingerprint recognizing member 450. For example, the annular structure 430 may be formed to enclose at least a portion of the cover layer 410 when viewed from the top side of the cover layer 410.

According to an example embodiment, the annular structure 430 may have a ring shape, and one end of the annular structure 430 is provided with a first step 431 inside the ring, thereby preventing the separation of the fingerprint recognizing member 450 and the cover layer 410 that are arranged inside the ring. Alternatively, the other end of the annular structure 430 is provided with a second step 433 outside the ring shape, thereby preventing the separation of the button structure 400 from the first plate 110.

According to an example embodiment, the first step 431 may be fitted to the stepped portion 455 of the fingerprint recognizing member 450, and may be implemented as a ring-shaped step when viewed from the top side. The second step 433 may face the bottom face of the lower plate 470, in which the second step may be formed in a ring-shaped step and the display 200 may prevent the second step 433 from being separated to the outside. However, the first and second steps 431 and 433 are not limited to the ring shape, and may be subjected to a design change to various shapes as long as they may prevent respective components from being separated to the outside and safely fix the respective components.

According to an example embodiment, the lower plate 470 may be disposed below the annular structure 430, and may be formed as an oval plate corresponding to the shape of the bottom face of the fingerprint recognizing member 450. Alternatively, at least one second opening 471 and a concave recess 473 may be included inside the lower plate.

According to an example embodiment, the cover layer 410 may cover the top face of the fingerprint recognizing member 450, the annular structure 430 may cover the side face of the fingerprint recognizing member 450, and the lower plate 470 may cover the bottom face of the fingerprint recognizing member 450 so that the bottom structure may be implemented in a shape that substantially encloses the fingerprint recognizing member 450. This is to protect the fingerprint recognizing member 450 from being damaged because the fingerprint recognizing member 450 is formed of a sensitive circuit that recognizes a fingerprint and exchanges information.

According to an example embodiment, the second opening 471 disposed in the lower plate 470 illustrated in FIG. 3 is communicated with at least a portion of the circuit region 453, and may be provided in a hole shape through which the flexible conductive member 500 connected with the circuit region 453 passes.

According to various embodiments of the present disclosure, the flexible conductive member 500 may extend to the lower side just below the fingerprint recognizing member 450 through the second opening 471. The flexible conductive member 500 connected with the fingerprint recognizing member 450 through the second opening 471 is electrically connectable to other electronic components with a relatively short length.

In an example embodiment of the present disclosure, the second opening 471 is provided in a rectangular shape having a size that allows the flexible conductive member 500 to pass therethrough, but may be implemented in various shapes such that various shapes of conductive members 500 may pass therethrough. Further, the flexible conductive member 500 may be implemented plurally.

Referring to FIG. 3 according to an example embodiment, the concave recess 473 may be disposed adjacent to the second opening 471 of the lower plate 470, and may provide a pressure transferred from the outside to the dome switch 900. For example, the concave recess 473 may be disposed in the central portion of the lower plate 470. This is to transfer the pressure applied by the user more correctly, and to minimize a lost force. In order to recognize only a fingerprint, the operation of the electronic device 10 may be performed merely by a touch without transferring a pressure to the button structure 400 by the user. However, the concave recess 473 may be utilized in order to transfer the pressure to the dome switch in the other various input processes. Of course, simultaneously with recognizing the fingerprint, the pressure may be transferred to the concave recess 473 for an operation that passes through any other input process.

According to an example embodiment, the concave recess 473 may be designed to have a concave shape when viewed from the top side, and to have a convex shape when viewed from the bottom side. The first opening 300 of the first plate 110, the concave recess 473 of the lower plate 470, and the dome switch 900 may be arranged on the same line.

Figure 8:
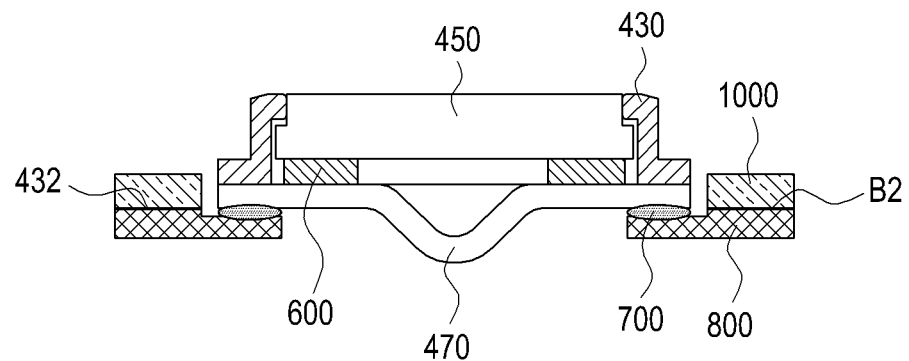

Referring to FIGS. 7 and 8 according to an example embodiment, the edge face B1 of the lower plate 470 may be coupled with the annular structure 430 such that the lower plate 470 and the annular structure 430 can cover the side face and bottom face of the fingerprint recognizing member 450. The edge face B1 of the lower plate 470 may have a ring shape to correspond to the shape of the annular structure 430, and the edge face B1 and the annular structure 430 may be bonded to each other through bonding, taping, ultrasonic welding, or the like.

According to an example embodiment, a first sealing member 600 may be disposed inside the lower plate 470 to be coupled with the fingerprint recognizing member 450.

The first sealing member 600 may be interposed between the lower plate 470 and the fingerprint recognizing member 450 in order to block external foreign matter (e.g., a fluid, such as moisture), and the opposite end faces of the first sealing member 600 may be respectively attached to the top face of the lower plate 470 and the bottom face of the fingerprint recognizing member 450 via taping.

Hereinafter, descriptions will be made on the flexible conductive member 500, the sealing members 600, 700, and 1100, the elastic member 800, and the bracket 1000 in addition to the button structure 400 of the key module 20.

Figure 9:
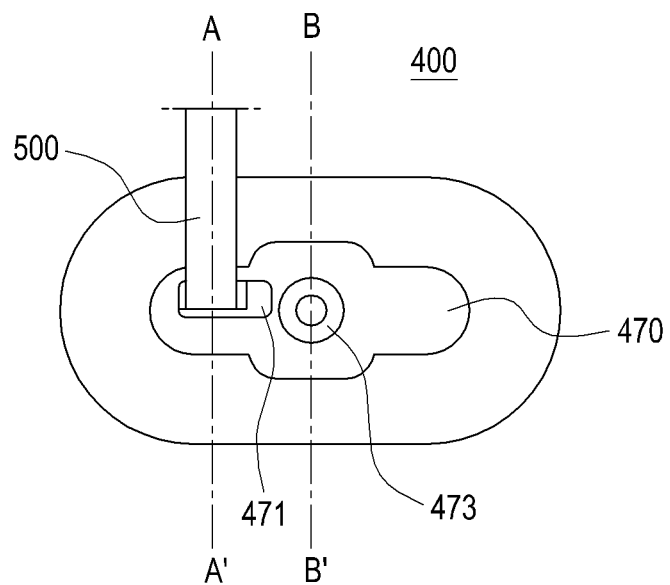
FIG. 9 is a diagram illustrating a state of a button structure of a key module according to an example embodiment of the present disclosure when viewed from the bottom side.
Figure 10:
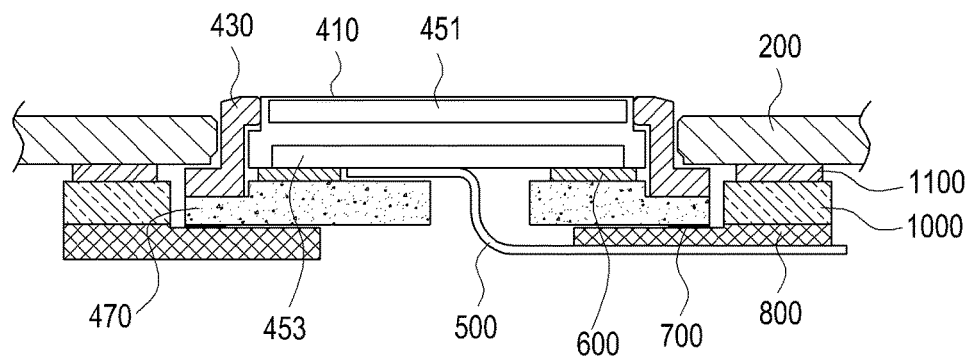
FIG. 10 is a cross-sectional side view of the key module along line A-A' in FIG. 9.
Figure 11:
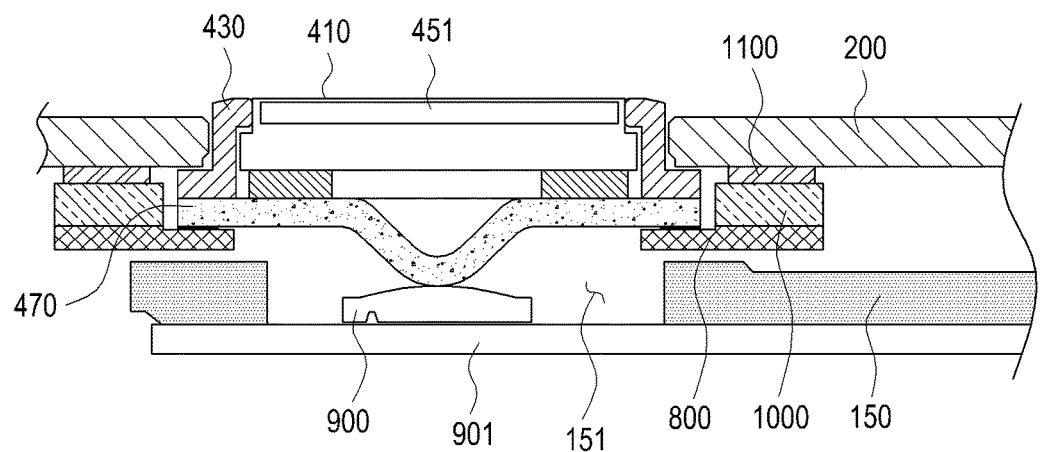
FIG. 11 is a cross-sectional side view of the key module along line B-B' in FIG. 9.

FIG. 9 is a view illustrating a state of a button structure 400 of a key module according to an example embodiment of the present disclosure when viewed from the bottom side. FIG. 10 is a sectional side view of the key module, which is illustrated by cutting the configuration of the key module along line A-A' in FIG. 9. FIG. 11 is a sectional side view of the key module, which is illustrated by cutting the configuration of the key module along line B-B' in FIG. 9.

Referring to FIGS. 8 to 11, the flexible conductive member 500 may extend to the circuit region 453 through the first opening 300 inside the space between the first plate 110 and the second plate 130, and may be electrically connected to the circuit region 453.

Referring to FIG. 10, when the configuration of the key module 20 is cut in direction A-A', the flexible conductive member 500 may extend to the inside of the electronic device 10 from the circuit region 453 via one or more openings.

The flexible conductive member 500 may include a Flexible Printed Circuit Board (FPCB).

According to an example embodiment of the present disclosure, the circuit board used inside the fingerprint recognizing member may be designed in such a manner in which a printed circuit board is used and a contact point is disposed on the circuit board to be electrically connected to the flexible printed circuit board.

According to an embodiment of the present disclosure, because the circuit boards of the PCB and FPCB made of different materials may be bonded to each other, it is possible to reduce a percentage of defects in the process while simplifying the configuration. For example, by implementing circuit boards with the bonding of different materials, it is possible to shorten the track of the flexible printed circuit board, which has been conventionally wasted, by connecting the circuit region 453 and the flexible conductive member 500 via the second opening 471. In addition, it is possible to save the material and to reduce a line loss which may be caused when the track increases (see FIG. 9).

According to an example embodiment, the flexible conductive member 500 may be connected to the electronic device 10 through the openings of the annular bracket 1000 and elastic member 800. Accordingly, as a waterproof point caused by an outward passage disappears, it is possible to improve the waterproof function.

According to an example embodiment, the mutual contact faces between the flexible conductive member 500 and the circuit region 453 may be designed to be bonded with a Thin FPCB Antenna (TFA) or hot bar soldering structure or an FPCB contact structure. With this bonding, the flexible conductive member 500 and the circuit region 453 may be electrically connected to each other, and may transfer a signal or a pressure, which is transferred from the fingerprint recognizing member 450, to the inside of the electronic device 10.

According to various embodiments of the present disclosure, referring to FIGS. 8 to 11, the key module 20 may include an elastic member 800 disposed below the lower plate 470. The elastic member 800 enables the button structure 400, which is pushed by the user's compression, to repeat click functions by returning to the initial position thereof, and is able to improve the click feeling with the dome switch 900.

According to an example embodiment, the elastic member may be disposed to be in contact with the edge of the bottom face of the lower plate 470. As the elastic member 800 is coupled with the lower plate 470 and the second sealing member 700 is disposed between the contact faces of the elastic member 800 and the lower plate 470, it is possible to prevent the infiltration of the fluid flowing in from the outside.

The elastic member 800 may be designed in an annular shape (e.g., a loop or ring shape), which corresponds to the entire shape of the key module 20 and includes an opening so as to allow the flexible conductive member 500 to extend therethrough. The ring-shaped structure of the elastic member 800 may be designed in a ring shape that is larger than the button structure 400.

The elastic member 800 may be designed in such a manner in which the ring shaped inner edge is connected with the lower plate 470, and the ring-shaped outer edge is connected with the bracket 1000. According to an embodiment of the present disclosure, the outer edge and the inner edge of the elastic member 800 may be formed to have different thicknesses, and the inner third opening 801 may be implemented in an oval shape of which one side is expanded in order to secure a marginal space according to the bending of the flexible conductive member 500. However, without being limited to this, the third opening 801 may be implemented in various sizes and shapes in order to secure the waterproof function and to set the initial position of the button structure 400.

According to an example embodiment, the outer edge face B2 of the elastic member 800 may be closely coupled while being in contact with the bottom face of the bracket 1000. Referring to FIG. 8, when viewed from the cross-section of the key module, the outer edge face B2 may be disposed to face the bracket to be symmetrical with reference to the center of the lower plate 470. The coupling may be implemented through bonding, taping, or double injection.

According to an example embodiment, the connector 20 may include the bracket 1000 disposed outside of the lower plate 470 or the annular structure 430. The bracket 1000 may protect the button structure 400, support the elastic member 800, and form an integral key module 20.

According to an example embodiment, the bracket 1000 may be disposed along the outer peripheral surface of the lower plate 470 or the annular structure 430, and may form a space in which the button structure 400 can be mounted.

The bottom face of the bracket 1000 may be disposed to face the elastic member 800, and the bracket 1000 and the elastic member 800 may be fixedly coupled to each other through bonding, taping, or double injection.

The top surface of the bracket 1000 may be disposed to face the display 200 and the third sealing member 1100 may be disposed between the contact faces of the bracket 1000 and the display 200, thereby preventing the infiltration of the fluid flowing in from the outside.

The bracket 1000 may be designed in an annular shape (e.g., a loop or ring shape), which corresponds to the entire shape of the key module 20 and includes an opening so as to allow the flexible conductive member 500 to extend therethrough. The ring-shaped structure of the bracket 1000 may be designed in a ring shape that is larger than the button structure 400 in order to enclose and protect the button structure 400.

According to an example embodiment, the key module 20 may include a plurality of sealing members 600, 700, and 1100. Each of the sealing members 600, 700, and 1100 may block moisture that flows in from the outside.

According to an example embodiment, the first sealing member 600 may be disposed between the fingerprint recognizing member 450 and the lower plate 470 and/or between the fingerprint recognizing member 450 and the annular structure 430. Alternatively, the first sealing member 600 may be designed in an annular shape (e.g., a loop or ring shape), which corresponds to the entire shape of the key module 20 and includes an opening so as to allow the flexible conductive member 500 to extend therethrough.

According to an example embodiment, the first sealing member 600 may be formed by using various materials (e.g., vinyl, rubber, plastic, nonferrous metal, or glass) that are capable of implementing the waterproof performance. The top and bottom faces of the first sealing member 600 may be in contact with, and may be coupled to, the fingerprint recognizing member 450 and the lower plate 470, respectively, thereby preventing the penetration of a fluid. For example, the fingerprint recognizing member 450, the first sealing member 600, and the lower plate 470 may be stacked one on another in this order from the top side.

The first sealing member 600 may form a waterproof contact face while being in contact with the top face of the lower plate 470 by a pressure applied by the user.

According to an example embodiment, the second sealing member 700 may be disposed between the elastic member 800 and the lower plate 470 and/or between the elastic member 800 and the annular structure 430. Alternatively, the second sealing member 700 may implement the waterproof performance by being coupled with the lower plate and/or the annular structure 430.

The second sealing member 700 may be designed in an annular shape (e.g., a loop or ring shape), which corresponds to the entire shape of the key module 20 and includes an opening so as to allow the flexible conductive member 500 to extend therethrough.

The second sealing member 700 may be formed by using various materials (e.g., vinyl, rubber, plastic, nonferrous metal, or glass) that are capable of implementing the waterproof performance. The top and bottom faces of the second sealing member 700 may be in contact with and may be coupled to the lower plate 470 and the elastic member 800, respectively, thereby preventing the penetration of a fluid. The lower plate 470, the second sealing member 700, and the elastic member 800 may be stacked one on another in this order from the top side.

The second sealing member 700 may form a waterproof contact face while being in contact with the bottom face of the lower plate 470 by a pressure applied by the user.

According to an example embodiment, the third sealing member 1100 may be inserted and disposed between the bracket 1000 and the display 200. Alternatively, the third sealing member 1100 may implement the waterproof performance by being coupled with the top face of the bracket and/or the bottom face of the display 200. The third sealing member 1100 may be disposed to be spaced apart from the outer circumferential face of the button structure 400.

The third sealing member 1100 may be designed in an annular shape (e.g., a loop or ring shape), which corresponds to the entire shape of the key module 20 and includes an opening so as to allow the flexible conductive member 500 to extend therethrough. Because the third sealing member 1100 exists outside the first sealing member 600 or the second sealing member 700, the third sealing member 1100 may be manufactured to be larger than the first sealing member 600 or the second sealing member 700.

The third sealing member 1100 may be formed by using various materials (e.g., vinyl, rubber, plastic, nonferrous metal, or glass) that are capable of implementing the waterproof performance. The top and bottom faces of the third sealing member 1100 may be in contact with and may be coupled to the bracket 1000 and the display 200, respectively, thereby preventing the penetration of a fluid. The display 200, the third sealing member 1100, and the bracket 1000 may be stacked one on another in this order from the top side.

Hereinafter, descriptions will be made on the dome switch 900 and the printed circuit part 901 which are disposed on a side member 150 of the housing 100.

Referring to FIGS. 1 and 11, according to various example embodiments of the present disclosure, when the configuration of the key module 20 is cut in direction B-B', the dome switch 900 is disposed to face the lower plate 470, and the key module 20 may be seated on the seating portion 151.

According to an example embodiment, the dome switch 900 may be disposed on the seating portion 151 while being exposed through the hole 152 of the first plate 110.

The dome switch 900 may include an elastic material, and may transfer a pressure applied from the outside to the printed circuit part 901. For example, when the button structure 400 receives the pressure from the top side in the outside, the concave recess 473 of the lower plate 470 may transfer the pressure to the dome switch 900 while coming in contact with the dome switch 900. Then, the shape of the dome switch 900 is partially elastically deformed so that the pressure may be transferred to the printed circuit part 901. When the pressure transferred from the outside disappears, the dome switch 900 may recover the sound dome shape again.

In order to assure that the pressure applied from outside can be correctly transferred, the centers of the first opening 300, the concave recess 473 of the lower plate 470, and the dome switch 900 may be arranged on the same line.

According to an example embodiment, the printed circuit part 901 may be disposed on the lower portion of the side member 150 to face the dome switch 900.

The portion disposed to be in contact with the dome switch 900 corresponds to a portion of the printed circuit part 901, and the remaining portion of the printed circuit part 901 may be disposed between the side member 150 and the second plate 130.

The printed circuit part 901 may include a Printed Circuit Board (PCB). The printed circuit part 901 may convert the pressure transferred from the above-mentioned dome switch 900 into an electric signal so as to make a support such that a function desired by the user may be performed. For example, when the button structure 400 receives the pressure from the top side in the outside, the concave recess 473 of the first plate 110 may transfer the pressure to the dome switch 900 while coming in contact with the dome switch 900. Thereafter, when the shape of the dome switch 900 is partially elastically deformed to transfer the pressure to the printed circuit board 901, an electric signal corresponding to the pressure may be generated to be transferred to an electronic component within the space.

The key module 20, which is provided in the electronic device 10 according to an example embodiment of the present disclosure, may include an opening disposed below the button structure 400 and the elastic member 800, and may be designed and manufactured such that the flexible printed circuit board is guided to pass to the inside of the bracket 1000 by using a different material bonding method between the flexible printed circuit board and the printed circuit board.

Hereinafter, the process of manufacturing the key module 20 of the electronic device 10 will be described in detail.

Figure 12:
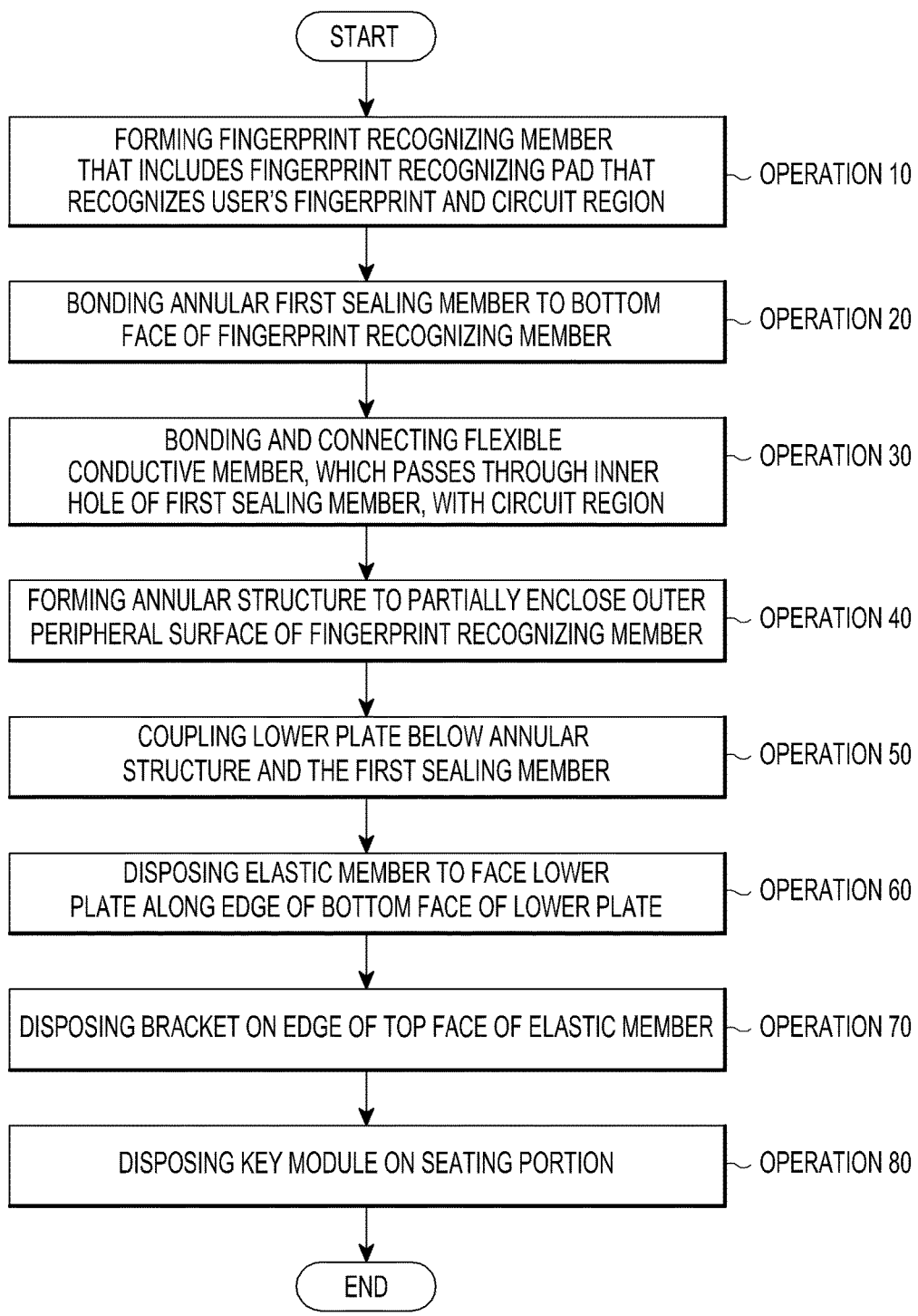
FIG. 12 is a flowchart illustrating an example method of manufacturing an electronic device according to an example embodiment of the present disclosure.

FIG. 12 is a flowchart illustrating a method of manufacturing an electronic device according to an example embodiment of the present disclosure.

FIGS. 6A and 6B, FIGS. 7A and 7B, FIG. 8, and FIG. 10 are sectional views sequentially illustrating the operations of manufacturing the key module 20.

In operation 10, an operation of forming the fingerprint recognizing member 450 (see FIG. 6A) may also be performed. The fingerprint recognizing pad 451 may be manufactured, which includes a plurality of conductive lines formed to recognize a user's information, and the circuit region 453 may be disposed below the fingerprint recognizing pad 451 to face the fingerprint recognizing pad 451. The fingerprint recognizing pad 451 may be a fingerprint recognition sensor. The circuit region 453 may be provided with conductive paths that are connected to the plurality of conductive lines, and may be formed of, for example, a Printed Circuit Board (PCB).

Alternatively, the cover layer 410 may be disposed on the top and side faces of the fingerprint recognizing pad 451 in order to protect the fingerprint recognizing pad 451 such that the fingerprint recognizing pad 451 is not damaged by an external pressure, scratch, or the like. The fingerprint recognizing member 450 and the cover layer 410 may be manufactured by an insert injection molding method.

In operation 20, an operation of bonding the annular first sealing member 600 to the lower portion of the fingerprint recognizing member 450 (see FIG. 6B) may be performed. The first sealing member 600 may be provided in a ring shape having an opening, and may be disposed to expose the circuit region 453 when viewed from the bottom side.

The annular first sealing member 600 and the fingerprint recognizing member 450 may be fixedly bonded to each other through taping, and the first sealing member 600 may be designed such that the circuit region 453 and the flexible conductive member 500 may be bonded and may extend to the outside through the opening disposed inside the first sealing member 600. The first sealing member 600 may include various materials (e.g., vinyl, rubber, plastic, nonferrous metal, or glass) that are capable of implementing the waterproof performance. The top and bottom faces of the first sealing member 600 may be in contact with and may be coupled to the fingerprint recognizing member 450 and the lower plate 470, respectively, thereby preventing the penetration of a fluid.

In operation 30, an operation of bonding and connecting the flexible conductive member 500 that passes through the opening inside the first sealing member 600 to the circuit region (see FIG. 7A) may be performed. The mutual contact faces between the flexible conductive member 500 and the circuit region 453 may be designed to be bonded with a Thin FPCB Antenna (TFA) or hot bar soldering structure or an FPCB contact structure. With this bonding, the flexible conductive member 500 and the circuit region 453 may be electrically connected to each other, and may transfer a signal or a pressure, which is transferred from the fingerprint recognizing member 450, to the inside of the electronic device 10.

In operation 40, an operation of forming the annular structure 430 to partially enclose the outer peripheral surface of the fingerprint recognizing member 450 (see FIG. 7B) may be performed. The annular structure 430 has a ring shape, and one end of the annular structure 430 is provided with a first step 431 inside the ring, thereby preventing the separation of the fingerprint recognizing member 450 and the cover layer 410 that are arranged inside the ring. Alternatively, the other end of the annular structure 430 is provided with a second step 433 outside the ring shape, thereby preventing the separation of the button structure 400.

In operation 50, an operation of coupling the lower plate 470 including the second opening 471 below the annular structure 430 and the first sealing member 600 may be performed. According to an example embodiment of the present disclosure, there is represented a method in which the lower plate 470 is coupled after disposing the annular structure 430. Without being limited thereto, however, the lower plate 470 is bonded to the bottom face of the first sealing member 600 first, and the annular structure 430 may be bonded to face the edge face of the lower plate 470.

The lower plate 470 and the annular structure 430 may be strongly bonded to each other using bonding, taping, ultrasonic welding, or the like.

The lower plate 470 may be formed as an oval plate corresponding to the shape of the bottom face of the fingerprint recognizing member 450. Alternatively, at least one second opening 471 and a concave recess 473 may be included inside the lower plate 470. The second opening 471 disposed in the lower plate 470 illustrated in FIG. 3 is communicated with at least a portion of the circuit region 453, and may be provided in a hole shape through which the flexible conductive member 500 connected with the circuit region 453 passes.

The concave recess 473 may be disposed adjacent to the second opening 471 of the lower plate 470, and may cause a pressure transferred from the outside to be transferred to the dome switch 900. For example, the concave recess 473 may be disposed in the central portion of the lower plate 470. This is to transfer the pressure applied by the user more correctly, and to minimize a lost force. In order to recognize only a fingerprint, the operation of the electronic device 10 may be performed merely by a touch without transferring a pressure to the button structure 400 by the user. However, the concave recess 473 may be utilized in order to transfer the pressure to the dome switch in the other various input processes. Of course, simultaneously with recognizing the fingerprint, the pressure may be transferred to the concave recess 473 for an operation that passes through any other input process.

In operation 60, an operation of disposing the elastic member 800 to face the lower plate 470 along the edge of the bottom face of the lower plate 470 (see FIG. 10) may be performed. As the elastic member 800 is coupled with the lower plate 470 and the second sealing member 700 is disposed between the contact faces of the elastic member 800 and the lower plate 470, it is possible to prevent the infiltration of the fluid flowing in from the outside.

The elastic member 800 may be designed in an annular shape (e.g., a loop or ring shape), which corresponds to the entire shape of the key module 20 and includes an opening so as to allow the flexible conductive member 500 to extend therethrough. The ring-shaped structure of the elastic member 800 may be designed to be larger than the ring-shaped structure of the button structure 400.

The elastic member 800 enables the button structure 400, which is pushed by the user's compression, to repeat clicks by returning to the initial position thereof, and is able to improve the click feeling with the dome switch 900.

Like the first sealing member 600, the second sealing member 700 may be designed in an annular shape (e.g., a loop or ring shape), which corresponds to the entire shape of the key module 20 and includes an opening so as to allow the flexible conductive member 500 to extend therethrough.

The second sealing member 700 may include various materials (e.g., vinyl, rubber, plastic, nonferrous metal, or glass) that are capable of implementing the waterproof performance. The top and bottom faces of the second sealing member 700 may be in contact with, and may be coupled to, the lower plate 470 and the elastic member 800, respectively, thereby preventing the penetration of a fluid.

The second sealing member 700 and the lower plate 470 or the elastic member 800 may be bonded to each other more strongly by using bonding, taping, double injection, or the like.

In operation 70, an operation of disposing the bracket 1000 on the edge of the top face of the elastic member 800 (see FIG. 10) may be performed. The bracket 1000 may be designed to be disposed along the outer peripheral surface of the annular structure 430, and to face the elastic member 800 and the display 200.

As the third sealing member 1100 is disposed between the contact faces of the bracket 1000 and the display 200, it is possible to prevent the infiltration of the fluid flowing in from the outside.

The bracket 1000 may be designed in an annular shape (e.g., a loop or ring shape), which corresponds to the entire shape of the key module 20 and includes an opening so as to allow the flexible conductive member 500 to extend therethrough. The ring-shaped structure of the bracket 1000 may be designed to be larger than the ring-shaped structure of the button structure 400 in order to enclose and protect the button structure 400.

In operation 80, an operation of disposing the key module 20 implemented through the above-mentioned manufacturing method on the seating portion 151 of the housing 100 (see FIG. 11) may be performed.

On the seating portion 151 of the housing 100, the dome switch 900 and the printed circuit part 901 may be disposed. In order to assure that the pressure applied from outside can be correctly transferred to the dome switch 900, the center of the concave recess 473 of the lower plate 470 and the center of the dome switch 900 may be arranged on the same line. The dome switch 900 may include an elastic material, and may transfer a pressure applied from the outside to the printed circuit part 901.

An electronic device 10 within the network environment 1800, in various example embodiments, will be described with reference to FIG. 13. The electronic device 10 may include a bus 1810, a processor (e.g., including processing circuitry) 1820, a memory 1830, an input/output interface (e.g., including input/output circuitry) 1850, a display 200, and a communication interface (e.g., including communication circuitry) 1870. In various example embodiments, at least one of the above-mentioned components may be omitted from the electronic device 10 or the electronic device 10 may additionally include other components.

The bus 1810 may include, for example, a circuit that interconnects the above-mentioned components 1810 to 1870 and transmits communication (e.g., a control message and/or data) between the components.

The processor 1820 may include various processing circuitry, such as, for example, and without limitation, one or more of a Central Processing Unit (CPU), an Application Processor (AP), and a Communication Processor (CP). The processor 1820 may execute, for example, an arithmetic operation or data processing that is related to a control and/or communication of one or more other components of the electronic device 10.

The memory 1830 may include a volatile memory and/or a non-volatile memory. The memory 1830 may store, for example, commands or data that are related to one or more other components of the electronic device 10. According to an example embodiment, the memory 1830 may store software and/or a program 1840. The program 1840 may include, for example, a kernel 1841, a middleware 1843, an Application Programming Interface (API) 1845, and/or an application program (or an "application") 1847. At least one of the kernel 1841, the middleware 1843, and the API 1845 may be referred to as an Operating System (OS).

The kernel 1841 may control or manage, for example, system resources (e.g., the bus 1810, the processor 1820, or the memory 1830) that are used for executing operations or functions implemented in the other programs (e.g., the middleware 1843, the API 1845, or the application programs 1847). Alternatively, the kernel 1841 may provide an interface that allows the middleware 1843, the API 1845, or the application programs 1847 to access individual components of the electronic device 10 so as to control or manage the system resources.

The middleware 1843 may play an intermediary role such that, for example, the API 1845 or the application programs 1847 may communicate with the kernel 1841 so as to exchange data.

Alternatively, the middleware 1843 may process one or more task requests that are received from the application programs 1847, according to priority. For example, the middleware 1843 may assign the priority to be capable of using a system resource of the electronic device 10 (e.g., the bus 1810, the processor 1820, or the memory 1830) to at least one of the application programs 1847. For example, the middleware 1843 may perform scheduling, load balancing, or the like for the one or more task requests by processing the one or more requests according to the assigned priority.

The API 1845 is, for example, an interface that allows the applications 1847 to control functions provided from the kernel 1841 or the middleware 1843, and may include, for example, one or more interfaces or functions (e.g., commands) for a file control, a window control, an image processing, or a character control.

The input/output interface 1850 may include various input/output circuitry that serve as an interface to transmit commands or data that are entered from, for example, a user or any other external device, to the other component(s) of the electronic device 10. The input/output interface 1850 may output commands or data, which are received from the other component(s) of the electronic device 10, to the user or the other external device.

The display 200 may include, for example, a Liquid Crystal Display (LCD), a Light Emitting Diode (LED) display, an Organic Light Emitting Diode (OLED) display, or a MicroElectroMechanical systems (MEMS) display, or an electronic paper display, or the like, but is not limited thereto. The display 200 may display various contents (e.g., text, image, video, icon, or symbol) to, for example, the user. The display 200 may include a touch screen, and may receive a touch input, a gesture input, a proximity input, or a hovering input that is made using, for example, an electronic pen or a part of the user's body.

The communication interface 1870 may include various communication circuitry configured to set, for example, communication between the electronic device 10 and an external device (e.g., a first external electronic device 12, a second external device 14, or a server 1806). For example, the communication interface 1870 may be connected with a network 1862 through wired or wireless communication so as to communicate with the external device (e.g., the second external electronic device 14 or the server 1806).

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. Alternatively, the wireless communication may include, for example, a short range communication 1864. The short range communication 1864 may include at least one of, for example, Wireless Fidelity (WiFi), Bluetooth, Near Field Communication (NFC), and Global Navigation Satellite System (GNSS). GNSS may include, for example, at least one of Global Positioning System (GPS), Global Navigation Satellite System (Glonass), Beidou Navigation Satellite System (hereinafter, "Beidou"), Galileo, and the European global satellite-based navigation system, according to, for example, a use area or band width. Herein, "GPS" may be interchangeably used with "GNSS" below. The wired communication may use at least one of, for example, Universal Serial Bus (USB), High Definition Multimedia Interface (HDMI), Recommended Standard 232 (RS-232), and Plain Old Telephone Service (POTS). The network 162 may include a telecommunication network (e.g., at least one of a computer network (e.g., LAN or WAN), the internet, and a telephone network).

Each of the first and second external electronic devices 12 and 14 may be the same type as, or different from, the electronic device 10. According to an example embodiment, the server 1806 may include a group of one or more servers. According to various embodiments, all or some of the operations to be executed by the electronic device 10 may be executed in another electronic device or a plurality of other electronic devices (e.g., the electronic devices 12 and 14 or the server 1806). According to an example embodiment, in the case where the electronic device 10 should perform a certain function or service automatically or by a request, the electronic device 10 may request some functions or services that are associated therewith from the other electronic devices (e.g., the electronic devices 12 and 14 or the server 1806), instead of, or in addition to, executing the functions or service by itself. The other electronic devices (e.g., the electronic devices 12 and 14 or the server 1806) may execute the requested functions or additional functions, and may deliver the results to the electronic device 10. The electronic device 10 may provide the requested functions or services by processing the received results as they are or additionally. For this purpose, for example, a cloud computing technique, a distributed computing technique, or a client-server computing technique may be used.

The electronic device 10 to be described below may be formed of any one of the above-mentioned wearable device, a notebook computer, a notebook computer, a smart phone, a tablet PC, Galaxy Tab, I-Pad, and a wireless charging device, or the like, but is not limited thereto. In the present embodiment, the electronic device 10 may be formed as a smart phone.

The wireless charging device according to various embodiments of the present disclosure refers to a device that wirelessly transmits/receives power within a short distance to charge the electronic device.

In addition, in the electronic device, a bezel region may be minimized to implement the design luxuriously while somewhat increasing a display unit of the electronic device, or a flexible display unit may be provided in order to implement a convex or concave display unit.

That is, a peripheral portion of the display unit may be bent, and a screen area may be provided to be used in a state where the screen area is enlarged to a side face portion of the display unit. As the screen area of the display unit is bent and provided to the side face portion thereof, it is possible to use the screen area in an enlarged state, or to use a separate screen on the side face portion, and it is also possible to implement the design luxuriously. In other words, the display unit may include a first view area, and second view areas provided on the opposite sides of the first screen area.

Figure 14:
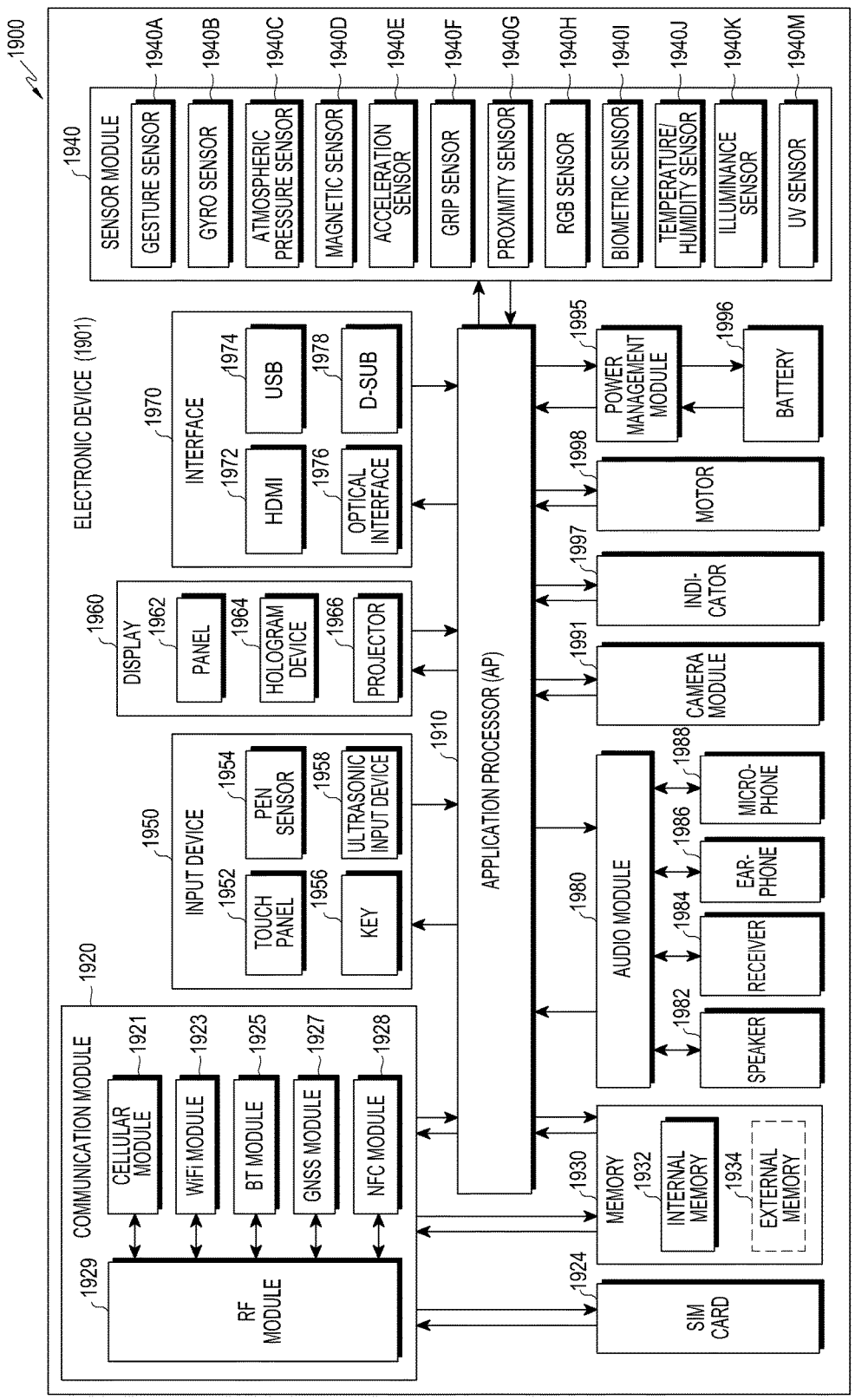
FIG. 14 is a block diagram illustrating an example configuration of an electronic device according to an example embodiment of the present disclosure.

FIG. 14 is a block diagram illustrating an example electronic device 1901 according to various embodiments. The electronic device 1901 may include, for example, the whole or a portion of the electronic device 10 illustrated in FIG. 1. The electronic device 1901 may include at least one processor (e.g., an Application Processor (AP)) (e.g., including processing circuitry) 1910, a communication module (e.g., including communication circuitry)1920, a subscriber identification module 1924, a memory 1930, a sensor module 1940, an input device (e.g., including input circuitry) 1950, a display 1960, an interface (e.g., including interface circuitry) 1970, an audio module 1980, a camera module 1991, a power management module 1995, a battery 1996, an indicator 1997, and a motor 1998.

The processor 1910 may include various processing circuitry configured to drive, for example, an operating system or an application program so as to control a plurality of hardware or software components connected thereto, and may also perform various data processing and arithmetic operations. The processor 1910 may be implemented by, for example, by processing circuitry in a System-on-Chip (SoC). According to an example embodiment, the processor 1910 may further include a Graphic Processing Unit (GPU) and/or an image signal processor. The processor 1910 may include at least some components (e.g., a cellular module 1921) among the components illustrated in FIG. 19. The processor 1910 may load a command or data received from at least one of the other components (e.g., a non-volatile memory) in a volatile memory to process the command and data, and may store various data in a non-volatile memory.

Figure 13:
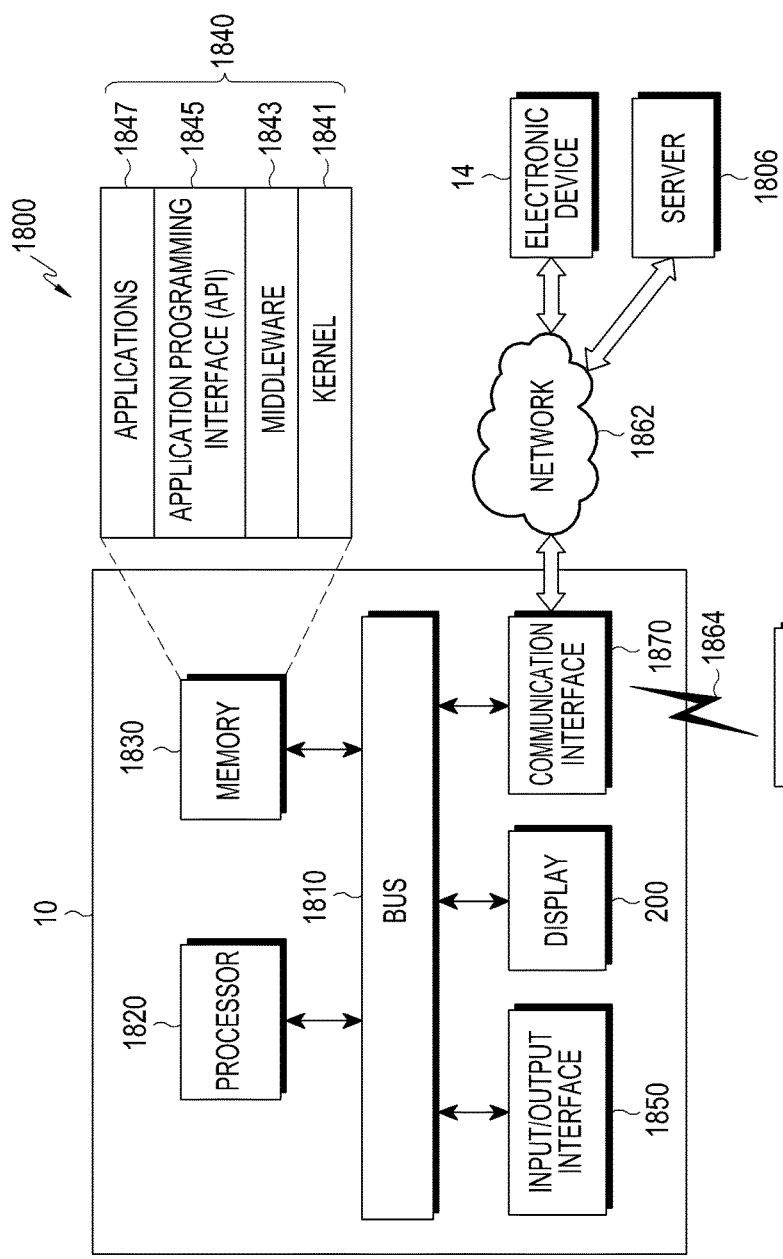
FIG. 13 is a block diagram illustrating an example network environment of an electronic device according to an example embodiment of the present disclosure.

The communication module 1920 may have a configuration that is the same as, or similar to, the communication interface 1870 of FIG. 13. The communication module 1920 may include various communication circuitry, such as, for example, and without limitation, a cellular module 1921, a WiFi module 1923, a Bluetooth module 1925, a GNSS module 1927 (e.g., GPS module, Glonass module, Beidou module, or Galileo module), an NFC module 1928, and a Radio Frequency (RF) module 1929.

The cellular module 1921 may provide, for example, a voice call, a video call, a message service, or an internet service through a communication network. According to an example embodiment, the cellular module 1921 may perform discrimination and authentication of the electronic device 1901 within the communication network by using the subscriber identification module (e.g., a SIM card) 1924. According to an example embodiment, the cellular module 1921 may perform at least some of the multimedia control functions that may be provided by the processor 1910. According to an example embodiment, the cellular module 1921 may include a Communication Processor (CP).

Each of the WiFi module 1923, the Bluetooth module 1925, the GNSS module 1927, and the NFC module 1928 may include, for example, a processor to process data transmitted/received through a corresponding module. According to a certain embodiment, at least some (e.g., two or more) of the cellular module 1921, the WiFi module 1923, the Bluetooth module 1925, the GNSS module 1927, and the NFC module 1928 may be incorporated in a single Integrated Chip (IC) or an IC package.

The RF module 1929 may transmit/receive a communication signal (e.g., an RF signal). The RF module 1929 may include, for example, a transceiver, a Power Amp Module (PAM), a frequency filter, a Low Noise Amplifier (LNA), or an antenna. According to another embodiment, at least one of the cellular module 1921, the WiFi module 1923, the Bluetooth module 1925, the GNSS module 1927, and the NFC module 1928 may transmit/receive an RF signal through one or more separate RF modules.

The subscriber identification module 1924 may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 1930 (e.g., the memory 1930) may include, for example, an internal memory 1932 and/or an external memory 1934. The internal memory 1932 may include at least one of, for example, a volatile memory (e.g., Dynamic RAM (DRAM), Static RAM (SRAM), or Synchronous DRAM (SDRAM)), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid State Drive (SSD)).

The external memory 1934 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1934 may be functionally and/or physically connected to the electronic device 1901 through various interfaces.

For example, the sensor module 1940 may measure a physical quantity or may sense an operating status of the electronic device 1901, and may then convert the measured or sensed information into electric signals. The sensor module 1940 may include at least one of, for example, a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (e.g., RGB (Red, Green, Blue) sensor), a biometric sensor 1940I, a temperature/humidity sensor 1940J, an illuminance sensor 1940K, and an Ultra-Violet (UV) sensor 1940M. Additionally or alternatively, the sensor module 1940 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 1940 may further include a control circuit for controlling one or more sensors incorporated therein. In a certain embodiment, the electronic device 1901 may further include a processor configured to control the sensor module 1940 as a part of the processor 1910 or separate from the processor 1910 so as to control the sensor module 1940 while the processor 1910 is in the sleep state.

The input device 1950 may include various input circuitry, such as, for example, and without limitation, a touch panel 1952, a (digital) pen sensor 1954, a key 1956, or an ultrasonic input device 1958. As the touch panel 1952, at least one of, for example, a capacitive type touch panel, a resistive type touch panel, an infrared type touch panel, and an ultrasonic type panel may be used. Alternatively, the touch panel 1952 may further include a control circuit. The touch panel 1952 may further include a tactile layer so as to provide a tactile reaction to the user.

The (digital) pen sensor 1954 may be, for example, a portion of the touch panel or may include a separate recognition sheet. The key 1956 may include, for example, a physical button, an optical key, or a keypad. The ultrasonic input device 1958 may sense, through a microphone (e.g., a microphone 1988), ultrasonic waves generated by an input tool so as to confirm data corresponding to the sensed ultrasonic waves.

The display 1960 (e.g., the display 1960) may include a panel 1962, a hologram device 1964, or a projector 1966. The panel 1962 may include a configuration that is the same as, or similar to, that of the display 160 of FIG. 1. The panel 1962 may be implemented to be, for example, flexible, transparent, or wearable. The panel 1962 may be configured as a single module with the touch panel 1952. The hologram device 1964 may show a stereoscopic image in the air using interference of light. The projector 1966 may project light onto a screen so as to display an image. The screen may be located, for example, inside or outside the electronic device 1901. According to an example embodiment, the display 1960 may further include a control circuit to control the panel 1962, the hologram device 1964, or the projector 1966.

The interface 1970 may include various interface circuitry, such as, for example, and without limitation, a High-Definition Multimedia Interface (HDMI) 1972, a Universal Serial Bus (USB) 1974, an optical interface 1976, or a D-5 subminiature (D-sub) 1978. For example, the interface 1970 may be included in the communication interface 170 illustrated in FIG. 3. Additionally or alternatively, the interface 1970 may include, for example, a Mobile High-definition Link (MHL) interface, a Secure Digital (SD) card/Multi-Media Card (MMC) interface, or an Infrared Data Association (IrDA) standard interface.

The audio module 1980 may bi-directionally convert, for example, sound and electric signals. At least some of the components of the audio module 1980 may be included in, for example, the input/output interface 1850 illustrated in FIG. 13. The audio module 1980 may process sound information input or output through, for example, a speaker 1982, a receiver 1984, an earphone 1986, or a microphone 1988.

The camera module 1991 is a device that is capable of photographing, for example, a still image and a video image, and according to an example embodiment, the camera module 2910 may include at least one image sensor (e.g., a front sensor or a rear sensor), a lens, an Image Signal Processor (ISP), or a flash (e.g., LED or xenon lamp).

The power management module 1995 may manage, for example, the electric power of the electronic device 1901. According to an example embodiment, the power management module 1995 may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 1996, and a voltage, a current, or a temperature during the charge. The battery 1996 may include, for example, a rechargeable battery and/or a solar battery.

The indicator 1997 may indicate a specific status (e.g., a booting status, a message status, or a charged status) of the electronic device 1901 or of a part thereof (e.g., AP 1910). The motor 1998 may convert an electric signal into a mechanical vibration, and may generate, for example, a vibration or a haptic effect. Although not illustrated, the electronic device 1901 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 15:
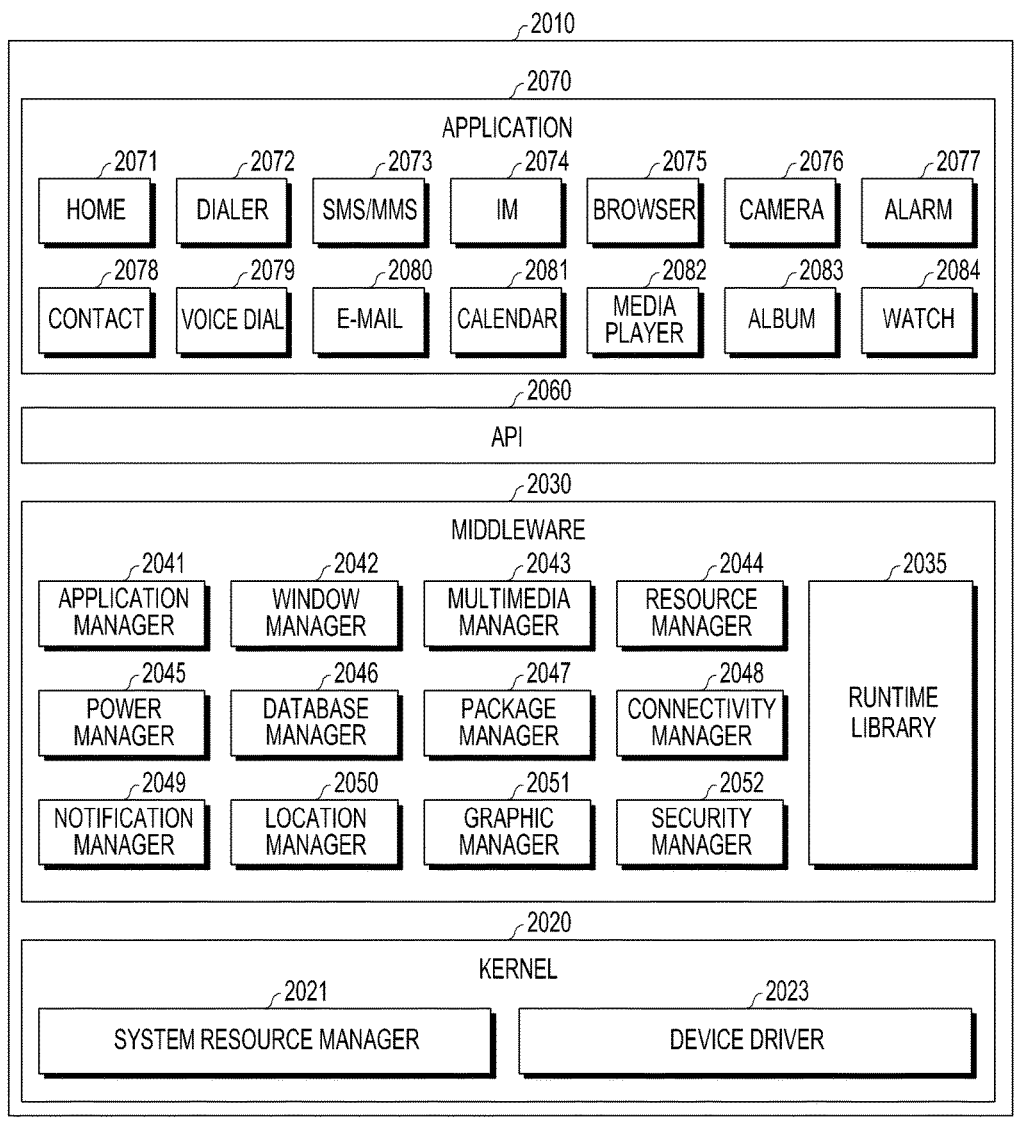
FIG. 15 is a block diagram illustrating an example program module of an electronic device according to an example embodiment of the present disclosure.

FIG. 15 is a block diagram illustrating an example program module according to various example embodiments. According to an example embodiment, a program module 2010 (e.g., the program 140) may include an Operating System (OS) that controls resources associated with an electronic device (e.g., the electronic device 10) and/or various applications (e.g., the application program 147) that are driven on the operating system. The operating system may be, for example, Android, iOS, Windows, Symbian, Tizen, or Bada.

The program module 2010 may include a kernel 2020, a middleware 2030, an Application Programming Interface (API) 2060, and/or an application 2070. At least a part of the program module 2010 may be preloaded on the electronic device, or may be downloaded from an external electronic device (e.g., the device 102 or 104, or the server 106).

The kernel 2020 (e.g., the kernel 1841) may include, for example, a system resource manager 2021 and/or a device driver 2023. The system resource manager 2021 may perform, for example, a control, allocation, or recovery of a system resource. According to an example embodiment, the system resource manager 2021 may include, for example, a process management unit, a memory management unit, or a file system management unit. The device driver 2023 may include, for example, a display driver, a camera driver, a Bluetooth driver, a common memory driver, a USB driver, a keypad driver, a WiFi driver, an audio driver, or an Inter-Process Communication (IPC) driver.

The middleware 2030 may provide, for example, a function that is commonly required by the applications 2070, or may provide various functions to the applications 2070 through the API 2060 such that the applications 2070 can efficiently use the limited system resources within the electronic device. According to an example embodiment, the middleware 2030 (e.g., the middleware 143) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 may include, for example, a library module that is used by a compiler in order to add a new function through a program language while the applications 2070 are executed. The runtime library 2035 may perform, for example, input/output management, memory management, or a function for an arithmetic function.

The application manager 2041 may manage, for example, a life cycle of at least one application among the applications 2070. The window manager 2042 may manage a GUI resource that is used in a screen. The multimedia manager 2043 may grasp a format required for reproducing various media files, and may perform encoding or decoding of the media files by using a codec that is suitable for the corresponding format. The resource manager 2044 may manage a resource, such as a source code, a memory, or a storage space, of at least one application among the applications 2070.

The power manager 2045 is operated together with, for example, a Basic Input/Output System (BIOS) so as to manage a battery or a power source, and may provide, for example, power information that is required for operating the electronic device. The database manager 2046 may generate, retrieve, or change a database to be used by at least one application among the applications 2070. The package manager 2047 may manage the installation or update of an application that is distributed in the form of a package file.

The connectivity manager 2048 may manage, for example, a wireless connection of WiFi, Bluetooth, or the like. The notification manager 2049 may display or notify events, such as an arrival message, appointment, and proximity notification in a manner that does not disturb the user. The location manager 2050 may manage position information of the electronic device. The graphic manager 2051 may manage a graphic effect to be provided to the user or a user interface associated therewith. The security manager 2052 may provide all security functions required for, for example, system security, or user authentication. According to an example embodiment, in the case where the electronic device (e.g., the electronic device 10) includes a phone function, the middleware 2030 may include a telephony manager to manage a voice or video call function of the electronic device.

The middleware 2030 may include a middleware module that forms a combination of various functions of the above-described components. The middleware 2030 may provide a module that is specialized for each kind of operation system in order to provide differentiated functions. Alternatively, the middleware 2030 may dynamically delete some of the existing components or add new components.

The API 2060 (e.g., the API 185) is, for example, a collection of API programming functions, and may be provided in different configurations according to operation systems. For example, Android or iOS may provide one API set for each platform and Tizen may provide two or more API sets for each platform.

The applications 2070 (e.g., the application program 2070) may include, for example, one or more applications that can execute, for example, the functions of home 2071, dialer 2072, SMS/MMS 2073, Instant Message (IM) 2074, browser 2075, camera 2076, alarm 2077, contact 2078, voice dial 2079, e-mail 2080, calendar 2081, media player 2082, album 2083, and watch 2084, health care (e.g., measurement of a quantity of motion, or blood sugar), or provision of environmental information (e.g., provision of atmospheric pressure, humidity, or temperature information).

According to an example embodiment, the applications 2070 may include an application that supports information exchange between the electronic device (e.g., the electronic device 10) and the external electronic devices (e.g., the electronic devices 12 and 14) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 102 and 104). Alternatively, the notification relay application may receive notification information from, for example, an external electronic device, and may provide the notification information to the user.

The device management application may manage (e.g., install, delete, or update) at least one function of an external electronic device (e.g., the electronic device 12 or 14) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to an example embodiment, the applications 2070 may include an application designated according to an attribute of an external electronic device (e.g., the electronic device 12 or 14) (e.g., a healthcare application of a mobile medical device). According to an example embodiment, the applications 2070 may include an application received from an external electronic device (e.g., the server 186 or the electronic device 12 or 14). According to an example embodiment, the applications 2070 may include a preloaded application or a third party application that is capable of being downloaded from the server. The names of the components of the program module 2010 according to the illustrated embodiment may vary depending on the kind of operation system.

According to various embodiments, at least a portion of the program module 2010 may be implemented by software, firmware, hardware (e.g., circuitry), or a combination of two or more thereof. At least a portion of the program module 2010 may be implemented (e.g., executed) by, for example, a processor (e.g., the processor 1820). At least a portion of the program module 2010 may include, for example, a module, a program, a routine, a set of instructions, or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure 30 may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 1820), may cause the one or more processors to execute the function corresponding to the instruction. The computer-readable storage medium may be, for example, the memory 1830.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, an electronic device may include: a housing comprising a first plate directed in a first direction, a second plate facing a second direction opposite the first plate, and a side member enclosing at least a portion of a space between the first plate and the second plate; a display disposed to be exposed through a first region of the first plate; a first opening formed in a second region of the first plate that is located adjacent to the display; a button disposed through the first opening; a flexible conductive member comprising a flexible conductor extending from the circuit region into the space through the second opening, and electrically connected to the circuit region; a first seal disposed between a fingerprint recognizing member and the lower plate and/or the fingerprint recognizing member and the annular structure; and a second seal coupled to the lower plate and/or the annular structure.

The button structure may include: a cover layer exposed to an outside of the housing, an annular structure that encloses at least a portion of the cover layer when viewed from above the cover layer, and a fingerprint recognizing member enclosed by the annular structure.

The fingerprint recognizing member may include: a fingerprint recognizing pad including a plurality of conductive lines formed to recognize a fingerprint when a user's finger comes in contact with the cover layer, and a circuit region including conductive paths connected to at least some of the plurality of conductive lines.

In addition, the electronic device may further include: a lower plate connected to the annular structure. The cover layer, the annular structure, and the lower plate are configured to substantially enclose the fingerprint recognizing member, and the lower plate may include a second opening that communicates with at least a portion of the circuit region.

According to various embodiments, the flexible conductive member may include a flexible printed circuit board.

According to various embodiments, the electronic device may further include a dome switch that is disposed within the space to receive a pressure when the pressure is applied to the button structure by the user.

According to various embodiments, the first sealing member may be formed in an annular shape.

According to various embodiments, the second sealing member may be formed in an annular shape.

According to various embodiments, the electronic device may further include an elastic member disposed within the space, the elastic member may include a third opening through which the flexible conductive member may extend, and the second sealing member may be inserted between the elastic member and the lower plate and/or between the elastic member and the annular structure.

According to various embodiments, the electronic device may further include a bracket disposed to at least partially enclose the lower plate or the annular structure, and forming a space to mount the button structure therein.

According to various embodiments, the electronic device may further include a third sealing member between the display and the bracket to block a fluid that infiltrates from the outside.

According to various embodiments, the lower plate may include a concave recess adjacent to the second opening, and the concave recess may allow a pressure transferred from the outside to be provided to the dome switch.

According to various embodiments, one end of the annular structure is provided with a first step inside the annular shape to prevent a separation of the fingerprint recognizing member disposed inside the annular shape, and another end of the annular structure is provided with a second step outside the annular shape to prevent a separation of the button structure.

According to various embodiments, the first sealing member includes a first waterproof contact face formed as the first sealing member is in contact with a top face of the lower plate, and the second sealing member includes a second waterproof contact face formed as the first sealing member is in contact with a bottom face of the lower plate.

According to various embodiments, the circuit region and the flexible conductive member are configured through bonding of different materials, and the flexible conductive member is contacted and connected with the conductive paths of the circuit region to receive an electric signal.

According to various embodiments, centers of the second opening of the first plate, the concave recess of the lower plate, and the dome switch are disposed on a same line.

According to various embodiments of the present disclosure, a key module of an electronic device may include: a fingerprint recognizing member that includes a fingerprint recognizing pad including a plurality of conductive lines formed to recognize a fingerprint, and conductive paths connected to at least some of the plurality of conductive lines; an annular structure formed to enclose the fingerprint recognizing member so as to prevent the fingerprint recognizing member from being separated outwardly; a lower plate connected to the annular structure and including an opening that is in contact with at least a portion of a circuit region; and a flexible conductive member extending from the circuit region into the space through the opening, and electrically connected to the circuit region.

According to various embodiments of the present disclosure, a method of manufacturing an electronic device may include: forming a fingerprint recognizing member that includes a fingerprint recognizing pad including a plurality of conductive lines formed to recognize a fingerprint and a circuit region including conductive paths that are connected to the plurality of conductive lines; bonding an annular first sealing member to a bottom face of the fingerprint recognizing member; contacting and connecting a flexible conductive member, which passes through an inner hole of the first sealing member, with the circuit region; and forming an annular structure to partially enclose an outer peripheral surface of the fingerprint recognizing member.

According to various embodiments, the method may further include coupling a lower plate including a second opening below the annular structure and the first sealing member.

According to various embodiments, the method may further include disposing an elastic member to face the lower plate along an edge of a bottom face of the lower plate, and disposing a second sealing member between the lower plate and the elastic member so as to bond the lower plate and the elastic member to each other.

According to various embodiments, the elastic member includes a third opening, and the flexible conductive member electrically connected to the circuit region extends from the circuit region into the electronic device through the third opening.

According to various embodiments, the method may further include disposing the bracket along the outer peripheral surface of the annular structure and bringing the bracket to be in contact with a top face of the elastic member.

According to various embodiments, the circuit region and the flexible conductive member are configured through bonding of different materials, and the flexible conductive member is formed to pass through the second opening of the lower plate.

While the present disclosure has been illustrated and described with reference to certain example embodiments thereof, it will be understood by those skilled in the art that various changes in form and details may be made therein without departing from the spirit and scope of the present disclosure as defined by the appended claims.

What is claimed is:

1. An electronic device comprising:
   a housing including a first plate directed in a first direction, a second plate that faces a second direction opposite the first direction, and a side member that encloses at least a portion of a space between the first plate and the second plate;
   a display disposed to be exposed through a first region of the first plate;
   a first opening formed in a second region of the first plate located adjacent to the display;
   a button structure disposed through the first opening, wherein the button structure comprises a cover layer exposed to an outside of the housing, an annular structure that encloses at least a portion of the cover layer when viewed from above the cover layer, and a fingerprint recognizing member comprising a fingerprint recognizing pad including a plurality of conductive lines formed to recognize a fingerprint when a finger comes in contact with the cover layer, the fingerprint recognizing member being enclosed by the annular structure, and a circuit region including conductive paths connected to at least some of the plurality of conductive lines;
   a lower plate connected to the annular structure, wherein the cover layer, the annular structure, and the lower plate are configured to substantially enclose the fingerprint recognizing member, and the lower plate includes a second opening that communicates with at least a portion of the circuit region;
   a flexible conductive member comprising a flexible conductor extending from the circuit region into the space through the second opening, and electrically connected to the circuit region;
   a first seal disposed between the fingerprint recognizing member and the lower plate and/or the fingerprint recognizing member and the annular structure; and
   a second seal coupled to the lower plate and/or the annular structure.

2. The electronic device of claim 1, wherein the flexible conductive member includes a flexible printed circuit board.

3. The electronic device of claim 1, further comprising: a dome switch disposed within the space and configured to receive a pressure when the pressure is applied to the button structure.

4. The electronic device of claim 1, wherein the first seal has an annular shape.

5. The electronic device of claim 1, wherein the second seal has an annular shape.

6. The electronic device of claim 1, further comprising an elastic member disposed within the space,
   wherein the elastic member includes a third opening through which the flexible conductive member may extend, and
   the second seal is inserted between the elastic member and the lower plate and/or between the elastic member and the annular structure.

7. The electronic device of claim 6, further comprising a bracket disposed to at least partially enclose the lower plate or the annular structure, and forming a space to mount the button structure therein.

8. The electronic device of claim 7, further comprising a third seal disposed between the display and the bracket and configured to block a fluid from infiltrating from the outside.

9. The electronic device of claim 3, wherein the lower plate includes a concave recess adjacent to the second opening, and the concave recess is configured to transfer pressure from the outside to the dome switch.

10. The electronic device of claim 1, wherein one end of the annular structure is provided with a first step inside the annular shape to prevent a separation of the fingerprint recognizing member disposed inside the annular shape, and another end of the annular structure is provided with a second step outside the annular shape to prevent a separation of the button structure.

11. The electronic device of claim 1, wherein the first seal includes a first waterproof contact face, and
the second seal includes a second waterproof contact face.

12. The electronic device of claim 2, wherein the circuit region and the flexible conductive member are configured through bonding of different materials, and the flexible conductive member is contacted and connected with the conductive paths of the circuit region to receive an electric signal.

13. The electronic device of claim 9, wherein centers of the second opening of the first plate, the concave recess of the lower plate, and the dome switch are disposed on a same line.

14. A key module comprising:
a fingerprint recognizing member comprising a fingerprint recognizing pad including a plurality of conductive lines configured to recognize a fingerprint, and conductive paths connected to at least some of the plurality of conductive lines;
an annular structure enclosing the fingerprint recognizing member so as to prevent the fingerprint recognizing member from being separated outwardly;
a lower plate connected to the annular structure and including an opening that is in contact with at least a portion of a circuit region; and
a flexible conductive member comprising a flexible conductor extending from the circuit region into the space through the opening, and electrically connected to the circuit region.

15. A method of manufacturing an electronic device, comprising:
forming a fingerprint recognizing member comprising a fingerprint recognizing pad including a plurality of conductive lines configured to recognize a fingerprint and a circuit region including conductive paths that are connected to the plurality of conductive lines;
bonding an annular first seal to a bottom face of the fingerprint recognizing member;
contacting and connecting a flexible conductive member, which passes through an inner hole of the first seal, with the circuit region; and
forming an annular structure to partially enclose an outer peripheral surface of the fingerprint recognizing member.

16. The method of claim 15, further comprising coupling a lower plate including a second opening below the annular structure and the first seal.

17. The method of claim 16, further comprising disposing an elastic member to face the lower plate along an edge of a bottom face of the lower plate, and disposing a second seal between the lower plate and the elastic member so as to bond the lower plate and the elastic member to each other.

18. The method of claim 16, wherein the elastic member includes a third opening, and the flexible conductive member electrically connected to the circuit region extends from the circuit region into the electronic device through the third opening.

19. The method of claim 17, further comprising: disposing the bracket along an outer peripheral surface of the annular structure and bringing the bracket in contact with a top face of the elastic member.

20. The method of claim 16, wherein the circuit region and the flexible conductive member are configured through bonding of different materials, and the flexible conductive member is formed to pass through the second opening of the lower plate.

* * * * *